(12) United States Patent
Cho et al.

(10) Patent No.: US 8,170,046 B2
(45) Date of Patent: May 1, 2012

(54) TERMINAL AND METHOD OF CONTROLLING BROADCASTING THEREIN

(75) Inventors: Beom Seok Cho, Seoul (KR); Soo Lim You, Gwangmyeong-si (KR)

(73) Assignee: LG Electronics Inc., Seoul (KR)

( * ) Notice: Subject to any disclaimer, the term of this patent is extended or adjusted under 35 U.S.C. 154(b) by 460 days.

(21) Appl. No.: 12/403,945

(22) Filed: Mar. 13, 2009

(65) Prior Publication Data
US 2009/0247220 A1 Oct. 1, 2009

(30) Foreign Application Priority Data

Mar. 31, 2008 (KR) ........................ 10-2008-0029927

(51) Int. Cl.
*H04J 3/16* (2006.01)
(52) U.S. Cl. ......... 370/437; 370/462; 370/465; 370/498
(58) Field of Classification Search .................. 370/437, 370/462, 465, 498
See application file for complete search history.

(56) References Cited

U.S. PATENT DOCUMENTS

| 7,929,059 B2* | 4/2011 | Watson et al. ................ 348/725 |
| 2005/0174483 A1 | 8/2005 | Ruckriem |
| 2005/0207398 A1* | 9/2005 | Choi et al. .................... 370/352 |
| 2006/0061693 A1* | 3/2006 | Lee et al. ...................... 348/731 |
| 2007/0067815 A1 | 3/2007 | Bowen et al. |
| 2007/0093263 A1 | 4/2007 | Song et al. |
| 2007/0188665 A1 | 8/2007 | Watson et al. |
| 2008/0060027 A1* | 3/2008 | Yang .............................. 725/88 |

\* cited by examiner

*Primary Examiner* — Ricky Ngo
*Assistant Examiner* — Dewanda Samuel
(74) *Attorney, Agent, or Firm* — Birch, Stewart, Kolasch & Birch, LLP

(57) ABSTRACT

A mobile terminal including a user input unit configured to select a first broadcast channel, and a controller configured to buffer broadcast data relevant to at least one second broadcast channel different than the first broadcast channel for a predetermined time if the first broadcast channel is selected and to stop buffering the broadcast data relevant to the at least one second broadcast channel when the predetermined time expires.

20 Claims, 22 Drawing Sheets

TERMINAL AND METHOD OF CONTROLLING BROADCASTING THEREIN

This application claims the benefit of the Korean Patent Application No. 10-2008-0029927, filed on Mar. 31, 2008, which is hereby incorporated by reference as if fully set forth herein.

BACKGROUND OF THE INVENTION

1. Field of the Invention

The present invention relates to a terminal and corresponding method for controlling a channel buffering operation.

2. Discussion of the Related Art

Mobile terminals now provide many additional services beside the basic call service. For example, user's can now access the Internet, play games, watch videos, listen to music, capture images and videos, record audio files, etc. Mobile terminals also now provide broadcasting programs such that user can watch television shows, sporting programs, videos etc.

Further, related art broadcast terminals continuously perform a buffering operation on neighboring channels of a specific channel while simultaneously outputting a broadcast signal provided from the specific channel. However, the continuous execution of the buffering operation for the neighbor channels increases the overall power consumption of the broadcast terminal. Therefore, the amount of battery power available for the broadcast terminal is continuously decreased.

SUMMARY OF THE INVENTION

Accordingly, one object of the present invention is to address the above-noted and other problems.

Another object of the present invention is to provide a terminal and corresponding method for controlling a channel buffering operation.

Still another object of the present invention is to provide a terminal and corresponding method for controlling a channel buffering operation that saves or increases an amount of available battery power.

Yet another object of the present invention is to provide a terminal and corresponding method for controlling a channel buffering operation for a predetermined time interval only when a channel selection process is being performed.

To achieve these objects and other advantages and in accordance with the purpose of the invention, as embodied and broadly described herein, the present invention provides in one aspect a mobile terminal including a user input unit configured to select a first broadcast channel, and a controller configured to buffer broadcast data relevant to at least one second broadcast channel different than the first broadcast channel for a predetermined time if the first broadcast channel is selected and to stop buffering the broadcast data relevant to the at least one second broadcast channel when the predetermined time expires.

In another aspect, the present invention provides a method of controlling a mobile terminal. The method includes selecting a first broadcast channel, and buffering broadcast data relevant to at least one second broadcast channel different than the first broadcast channel for a predetermined time if the first broadcast channel is selected and stopping the buffering the broadcast data relevant to the at least one second broadcast channel when the predetermined time expires.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings.

Figure 1:
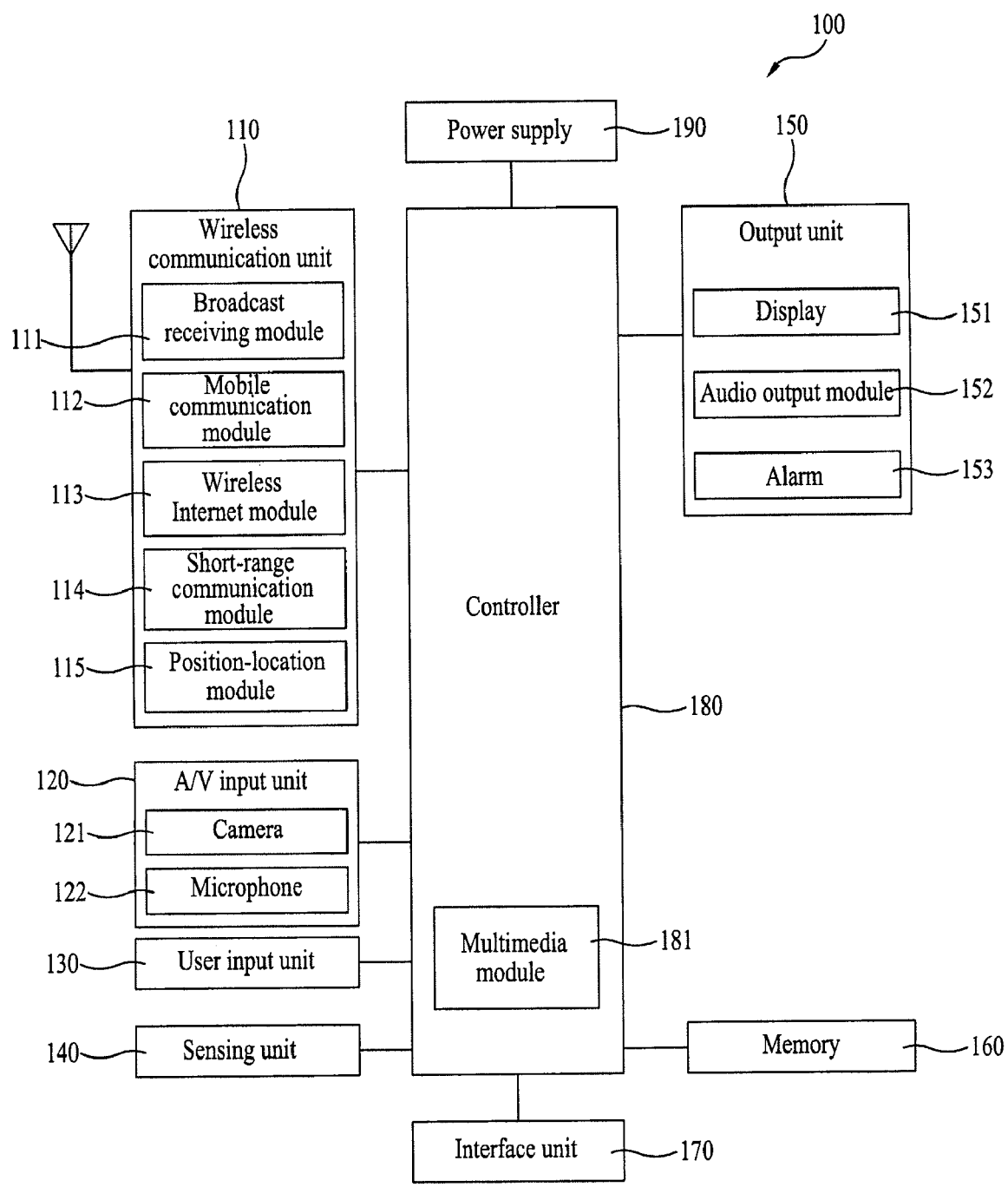
FIG. 1 is a block diagram of a terminal according to an embodiment of the present invention.

FIG. 1 is a block diagram of a mobile terminal 100 according to an embodiment of the present invention. As shown, the mobile terminal 100 includes a wireless communication unit 110 having one or more components which permits wireless communication between the mobile terminal 100 and a wireless communication system or network within which the mobile terminal is located.

For example, the wireless communication unit 110 includes a broadcast receiving module 111 that receives a broadcast signal and/or broadcast associated information from an external broadcast managing entity via a broadcast channel. The broadcast channel may include a satellite channel and a terrestrial channel.

In addition, the broadcast managing entity generally refers to a system which transmits a broadcast signal and/or broadcast associated information. Examples of broadcast associated information include information associated with a broadcast channel, a broadcast program, a broadcast service provider, etc. For instance, broadcast associated information may include an electronic program guide (EPG) of digital multimedia broadcasting (DMB) and electronic service guide (ESG) of digital video broadcast-handheld (DVB-H).

In addition, the broadcast signal may be implemented as a TV broadcast signal, a radio broadcast signal, and a data broadcast signal, among others. The broadcast signal may further include a broadcast signal combined with a TV or radio broadcast signal.

The broadcast receiving module 111 is also configured to receive broadcast signals transmitted from various types of broadcast systems. For example, such broadcasting systems include the digital multimedia broadcasting-terrestrial (DMB-T) system, the digital multimedia broadcasting-satellite (DMB-S) system, the digital video broadcast-handheld (DVB-H) system, the data broadcasting system known as media forward link only (MediaFLO®) and the integrated services digital broadcast-terrestrial (ISDB-T) system among others. Receiving multicast signals is also possible. Further, data received by the broadcast receiving module 111 may be stored in a suitable device, such as a memory 160.

The wireless communication unit 110 also includes a mobile communication module 112 that transmits/receives wireless signals to/from one or more network entities (e.g., base station, Node-B). Such signals may represent audio, video, multimedia, control signaling, and data, among others.

Also included is a wireless Internet module 113 that supports Internet access for the mobile terminal. The module 113 may be internally or externally coupled to the terminal. The wireless communication unit 110 also includes a short-range communication module 114 that facilitates relatively short-range communications. Suitable technologies for implementing this module include radio frequency identification (RFID), infrared data association (IrDA), ultra-wideband (UWB), as well at the networking technologies commonly referred to as Bluetooth and ZigBee, to name a few.

A position-location module 115 is also included in the wireless communication unit 110 and identifies or otherwise obtains the location of the mobile terminal 100. The position-location module 115 may be implemented using global positioning system (GPS) components which cooperate with associated satellites, network components, and combinations thereof.

In addition, as shown in FIG. 1, the mobile terminal 100 also includes an Audio/video (A/V) input unit 120 that provides audio or video signals to the mobile terminal 100. As shown, the A/V input unit 120 includes a camera 121 and a microphone 122. The camera 121 receives and processes image frames of still pictures or video.

Further, the microphone 122 receives an external audio signal while the portable device is in a particular mode, such as phone call mode, recording mode and voice recognition mode. The received audio signal is then processed and converted into digital data. Also, the portable device, and in particular, the A/V input unit 120, includes assorted noise removing algorithms to remove noise generated in the course of receiving the external audio signal. In addition, data generated by the A/V input unit 120 may be stored in the memory 160, utilized by an output unit 150, or transmitted via one or more modules of the communication unit 110. If desired, two or more microphones and/or cameras may be used.

The mobile terminal 100 also includes a user input unit 130 that generates input data responsive to user manipulation of an associated input device or devices. Examples of such devices include a keypad, a dome switch, a touchpad (e.g., static pressure/capacitance), a jog wheel and a jog switch. A specific example is one in which the user input unit 130 is configured as a touchpad in cooperation with a touch screen display, which will be described in more detail below.

A sensing unit 140 is also included in the mobile terminal 100 and provides status measurements of various aspects of the mobile terminal 100. For instance, the sensing unit 140 may detect an open/close status of the mobile terminal 100, relative positioning of components (e.g., a display and keypad) of the mobile terminal 100, a change of position of the mobile terminal 100 or a component of the mobile terminal 100, a presence or absence of user contact with the mobile terminal 100, orientation or acceleration/deceleration of the mobile terminal 100, etc.

As an example, when the mobile terminal 100 is a slide-type mobile terminal, the sensing unit 140 may sense whether a sliding portion of the mobile terminal 100 is open or closed. Other examples include the sensing unit 140 sensing the presence or absence of power provided by a power supply 190, the presence or absence of a coupling or other connection between an interface unit 170 and an external device, etc.

Further, the interface unit 170 is implemented to couple the mobile terminal 100 with external devices. Examples of external devices include wired/wireless headphones, external chargers, power supplies, storage devices configured to store data (e.g., audio, video, pictures, etc.), earphones, and microphones, among others. In addition, the interface unit 170 may be configured using a wired/wireless data port, a card socket (e.g., for coupling to a memory card and a device equipped with identity module), audio input/output ports and video input/output ports In this instance, the identity module is constructed with a chip that stores various kinds of information for identifying or authenticating a use authority of the terminal 100. In addition, the identity module can include one of a user identity module (UIM), a subscriber identity module (SIM), a universal subscriber identity module (USIM) and the like. In particular, the identity module can include a module for identifying or authenticating authority for purchasing and/or viewing a broadcast using the terminal 100. Also, a device provided with the identity module (hereinafter called 'identity device') can be manufactured in a smart card type. Hence, the identity device can be connected to the terminal 100 via a port for connecting it to the terminal 100.

The output unit 150 generally includes various components which support the output requirements of the mobile terminal 100. The mobile terminal 100 also includes a display 151 that visually displays information associated with the mobile terminal 100. For instance, if the mobile terminal 100 is operating in a phone call mode, the display 151 will generally provide a user interface or graphical user interface, which includes information associated with placing, conducting, and terminating a phone call. As another example, if the mobile terminal 100 is in a video call mode or a photographing mode, the display 151 may additionally or alternatively display images which are associated with these modes.

Further, the display 151 also preferably includes a touch screen working in cooperation with an input device, such as a touchpad. This configuration permits the display 151 to function both as an output device and an input device. In addition, the display 151 may be implemented using display technologies including, for example, a liquid crystal display (LCD), a thin film transistor-liquid crystal display (TFT-LCD), an organic light-emitting diode display (OLED), a flexible display and a three-dimensional display.

The mobile terminal 100 may also include one or more of such displays. An example of a two-display embodiment is one in which one display is configured as an internal display (viewable when the terminal is in an opened position) and a second display configured as an external display (viewable in both the open and closed positions).

FIG. 1 further shows the output unit 150 having an audio output module 152. which supports the audio output requirements of the mobile terminal 100. The audio output module 152 may be implemented using one or more speakers, buzzers, other audio producing devices, and combinations thereof.

Further, the audio output module 152 functions in various modes including a call-receiving mode, a call-placing mode, a recording mode, a voice recognition mode and a broadcast reception mode. During operation, the audio output module 152 outputs audio relating to a particular function (e.g., call received, message received, and errors).

In addition, the output unit 150 is further shown having an alarm 153, which is used to signal or otherwise identify the occurrence of a particular event associated with the mobile terminal 100. Typical events include a call received, a message received and user input received. An example of such output includes the providing of tactile sensations (e.g., vibration) to a user. For instance, the alarm 153 may be configured to vibrate responsive to the mobile terminal 100 receiving a call or message.

As another example, a vibration is provided by alarm 153 responsive to receiving user input at the mobile terminal 100, thus providing a tactile feedback mechanism. Further, the various outputs provided by the components of the output unit 150 may be separately performed, or such output may be performed using any combination of such components.

In addition, the memory 160 is generally used to store various types of data to support the processing, control, and storage requirements of the mobile terminal 100. Examples of such data include program instructions for applications operating on the mobile terminal 100, call history, contact data, phonebook data, messages, pictures, video, etc.

Further, the memory 160 shown in FIG. 1 may be implemented using any type or combination of suitable volatile and non-volatile memory or storage devices including random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, card-type memory, or other similar memory or data storage device.

The terminal 100 also includes a controller 180 that generally controls the overall operations of the mobile terminal 100. For instance, the controller 180 performs the control and processing associated with voice calls, data communications, instant message communications, video calls, camera operations and recording operations. As shown in FIG. 1, the controller 180 may also include a multimedia module 181 for providing multimedia playback functions. The multimedia module 181 may be configured as part of the controller 180, or may be implemented as a separate component.

In addition, a power supply 190 provides power used by the various components for the portable device. The provided power may be internal power, external power, or combinations thereof.

Figure 2A:
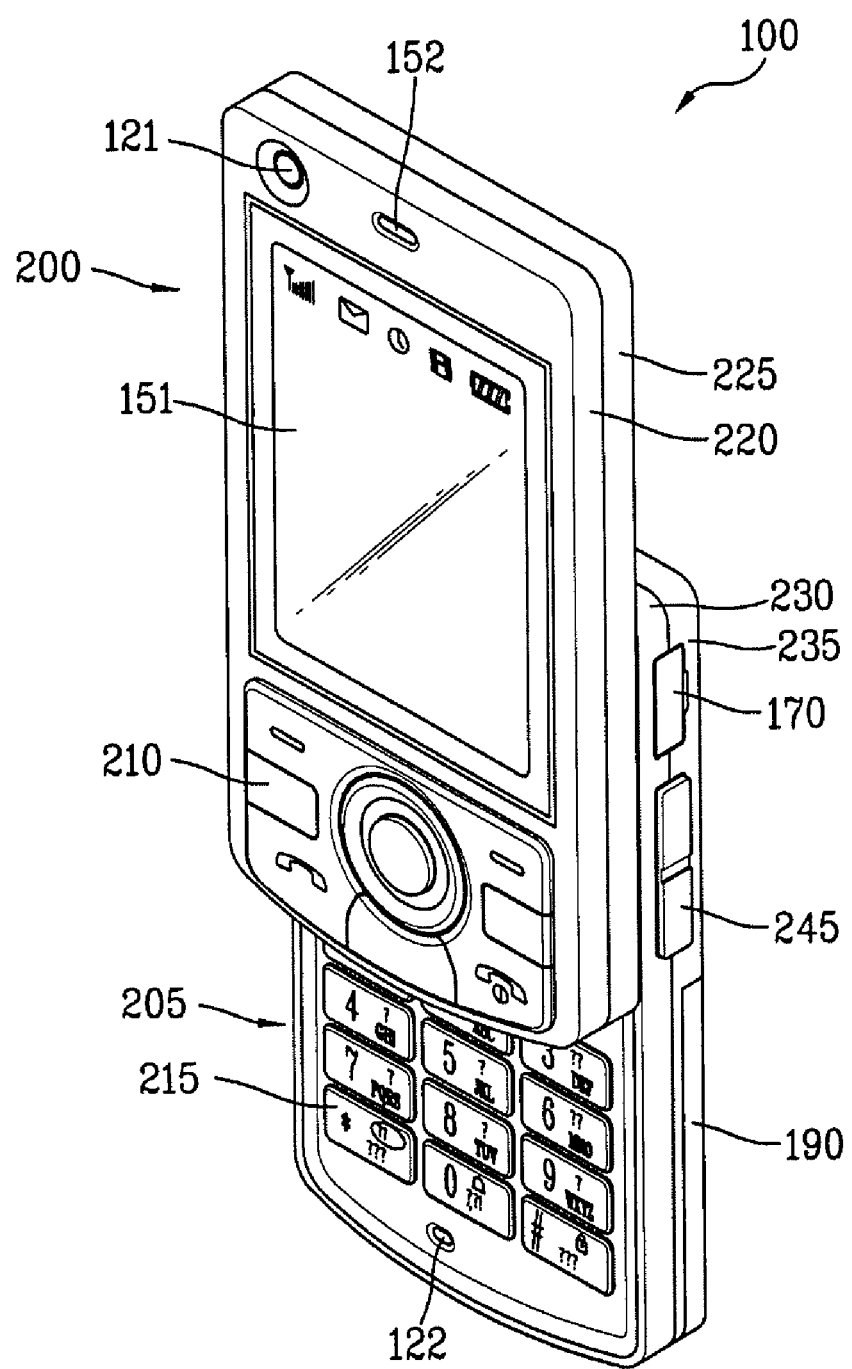
FIGS. 2A and 2B are a perspective view and a rear view of a terminal according to an embodiment of the present invention.

Next, FIG. 2A is a front side view of the mobile terminal 100 according to an embodiment of the present invention. As shown in FIG. 2A, the mobile terminal 100 includes a first body 200 configured to slideably cooperate with a second body 205. The user input unit 130 described in FIG. 1 may include a first input unit such as function keys 210, a second input unit such as a keypad 215, and a third input unit such as side keys 245.

The function keys 210 are associated with the first body 200, and the keypad 215 is associated with the second body 205. The keypad 215 includes various keys (e.g., numbers, characters, and symbols) to enable a user to place a call, prepare a text or multimedia message, and otherwise operate the mobile terminal 100.

In addition, the first body 200 slides relative to the second body 205 between open and closed positions. In a closed position, the first body 200 is positioned over the second body 205 in such a manner that the keypad 215 is substantially or completely obscured by the first body 200. In the open position, user access to the keypad 215, as well as the display 151 and function keys 210, is possible. The function keys 210 are convenient to a user for entering commands such as start, stop and scroll commands.

Further, the mobile terminal 100 is operable in either a standby mode (e.g., able to receive a call or message, receive and respond to network control signaling), or an active call mode. Typically, the mobile terminal 100 functions in a standby mode when in the closed position, and an active mode when in the open position. However, the mode configuration may be changed as required or desired.

In addition, the first body 200 is formed from a first case 220 and a second case 225, and the second body 205 is formed from a first case 230 and a second case 235. The first and second cases are usually formed from a suitably ridge material such as injection molded plastic, or formed using metallic material such as stainless steel (STS) and titanium (Ti).

If desired, one or more intermediate cases may be provided between the first and second cases of one or both of the first and second bodies 200 and 205. In addition, the first and second bodies 200 and 205 are generally sized to receive electronic components used to support the operation of the mobile terminal 100.

Also, the first body 200 includes the camera 121 and the audio output unit 152, which is configured as a speaker, positioned relative to the display 151. The camera 121 may also be constructed in such a manner that it can be selectively positioned (e.g., rotated, swiveled, etc.) relative to the first body 200.

Further, the function keys 210 are positioned adjacent to a lower side of the display 151. As discussed above, the display 151 can be implemented as an LCD or OLED. The display 151 may also be configured as a touch screen having an underlying touchpad which generates signals responsive to user contact (e.g., finger, stylus, etc.) with the touch screen.

Also, the second body 205 includes the microphone 122 positioned adjacent to the keypad 215, and side keys 245, which are one type of a user input unit, positioned along the side of the second body 205. Preferably, the side keys 245 are configured as hot keys, such that the side keys 245 are associated with a particular function of the mobile terminal 100. As shown, the interface unit 170 is positioned adjacent to the side keys 245, and the power supply 190 in a form of a battery is located on a lower portion of the second body 205.

Figure 2B:
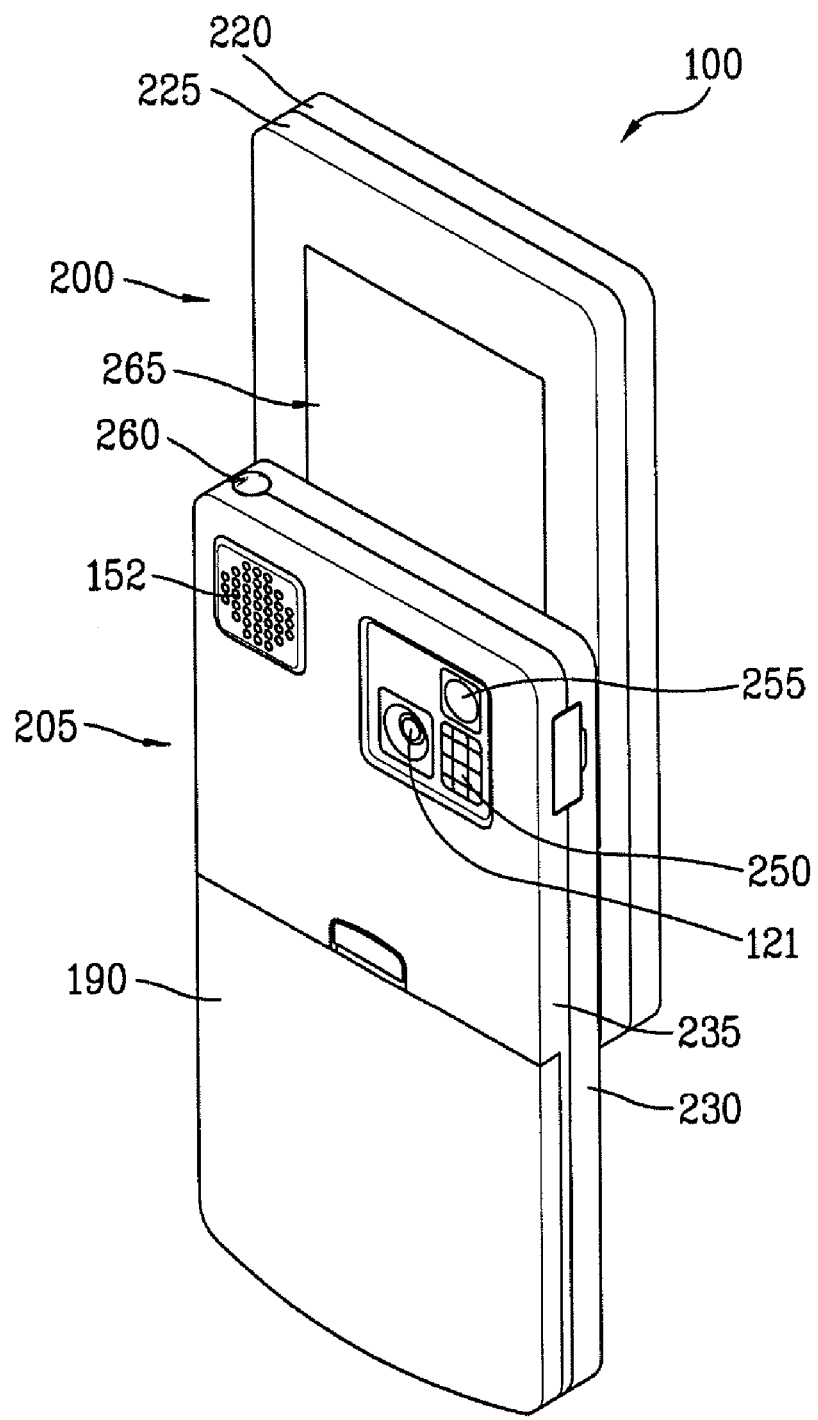

FIG. 2B is a rear side view of the mobile terminal 100 shown in FIG. 2A. As shown in FIG. 2B, the second body 205 includes the camera 121, and an associated flash 250 and mirror 255. The flash 250 operates in conjunction with the camera 121 of the second body 205, and the mirror 255 is useful for assisting a user to position the camera 121 in a self-portrait mode. In addition, the camera 121 of the second body 205 faces a direction which is opposite to a direction faced by the camera 121 of the first body 200 shown in FIG. 2A.

In addition, each of the cameras 121 of the first and second bodies 200 and 205 may have the same or different capabilities. For example, in one embodiment, the camera 121 of the first body 200 operates with a relatively lower resolution than the camera 121 of the second body 205. Such an arrangement works well during a video conference call, for example, in which reverse link bandwidth capabilities may be limited. Further, the relatively higher resolution of the camera 121 of the second body 205 (FIG. 2B) is useful for obtaining higher quality pictures for later use.

The second body 205 also includes the audio output module 152 configured as a speaker, and which is located on an upper side of the second body 205. The audio output modules of the first and second bodies 200 and 205 may also cooperate together to provide stereo output. Moreover, either or both of these audio output modules may be configured to operate as a speakerphone.

The terminal 100 also includes a broadcast signal receiving antenna 260 located at an upper end of the second body 205. The antenna 260 functions in cooperation with the broadcast receiving module 111 (FIG. 1). If desired, the antenna 260 may be fixed or configured to retract into the second body 205. Further, the rear side of the first body 200 includes a slide module 265, which slideably couples with a corresponding slide module located on the front side of the second body 205.

In addition, the illustrated arrangement of the various components of the first and second bodies 200 and 205 may be modified as required or desired. In general, some or all of the components of one body may alternatively be implemented on the other body. Further, the location and relative positioning of such components may be positioned at locations which differ from those shown by the representative figures.

Figure 3A:
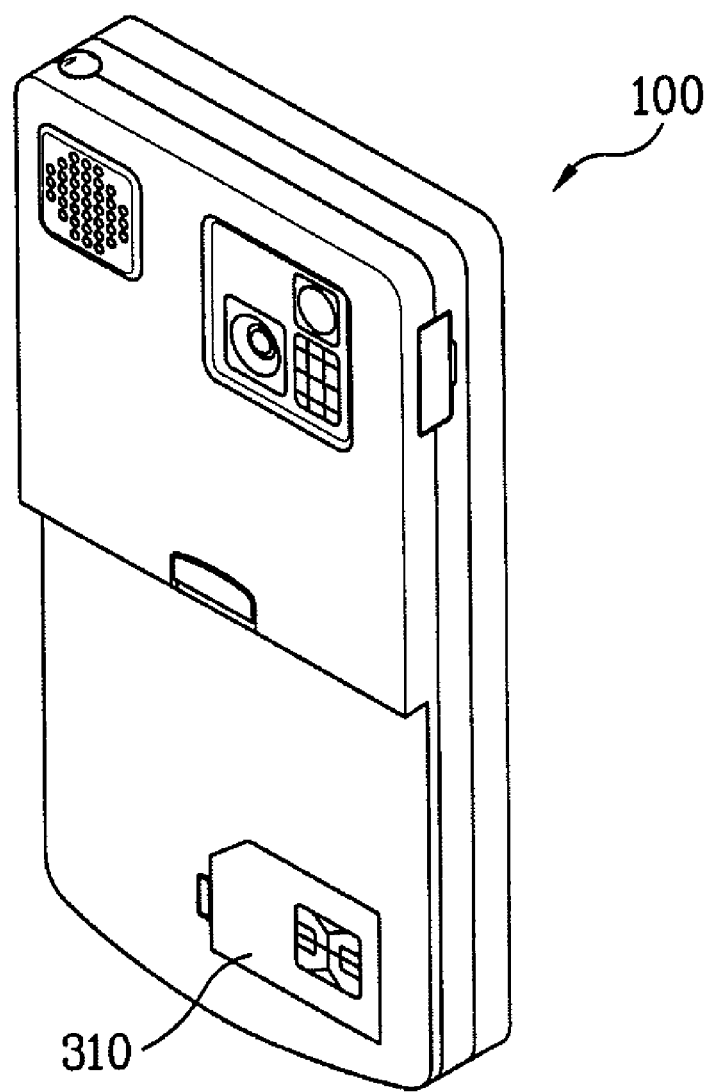
FIGS. 3A and 3B are rear views of a terminal according to an embodiment of the present invention in which the terminal includes an identity device.
Figure 3B:
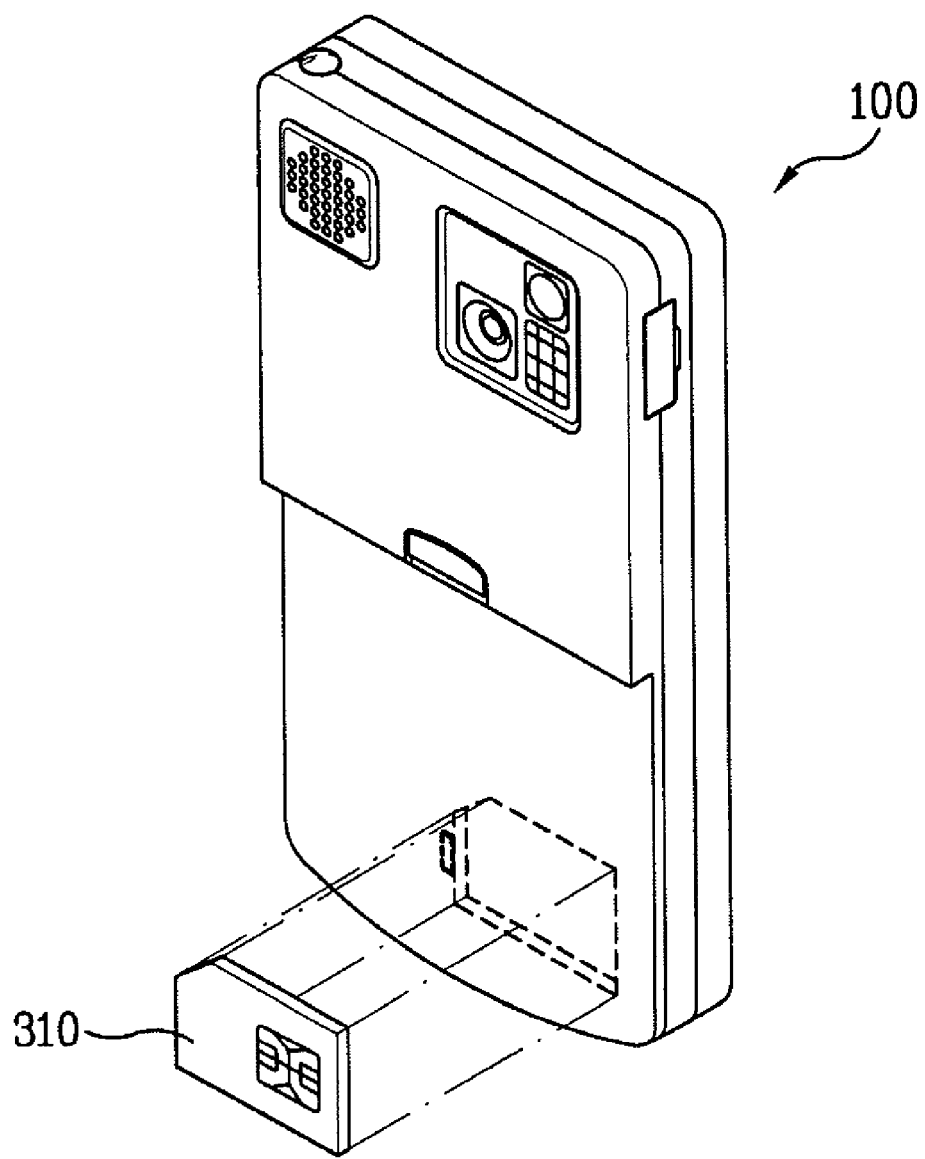

Next, FIGS. 3A and 3B are rear views of a terminal according to an embodiment of the present invention in which the terminal includes an identity device from the terminal. In this instance, the identity device can include a SIM card, for example.

As shown in FIGS. 3A and 3B, the terminal 100 includes an identity device 310 that is provided detachable from the terminal 100. Thus, a new or different identity device 310 can be installed into the terminal 100 as desired. The identity device 310 can also be loaded in the terminal 100 by being combined with the interface 170 or being connected to a separately provided connector for the connection with the identity device 310.

Further, the identity device 310 and the terminal 100 can be connected together via a connecting mechanism provided to any part of the terminal 100. For instance, the connecting mechanism can be provided to one of a backside, a lateral side, a front side of the terminal 100 and the like.

In addition, the mobile terminal 100 of FIGS. 1-3 may be configured to operate within a communication system which transmits data via frames or packets, including both wireless and wireline communication systems, and satellite-based communication systems. Such communication systems utilize different air interfaces and/or physical layers.

Examples of such air interfaces utilized by the communication systems include, for example, frequency division multiple access (FDMA), time division multiple access (TDMA), code division multiple access (CDMA), and universal mobile telecommunications system (UMTS), the long term evolution (LTE) of the UMTS, and the global system for mobile communications (GSM). By way of a non-limiting example only, further description will relate to a CDMA communication system, but such teachings apply equally to other system types.

Figure 4:
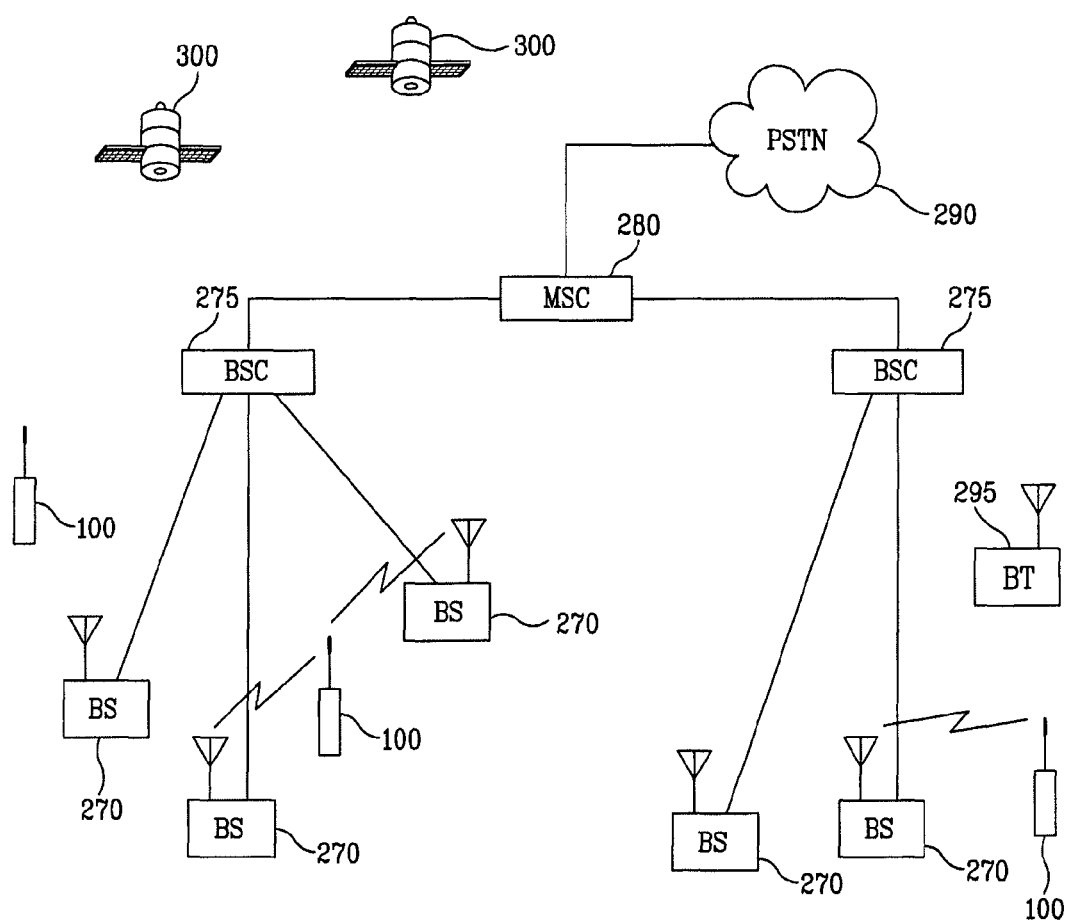
FIG. 4 is a block diagram of a CDMA wireless communication system operable with the terminal of FIGS. 1-3B.

Next, FIG. 4 illustrates a CDMA wireless communication system having a plurality of mobile terminals 100, a plurality of base stations 270, a plurality of base station controllers (BSCs) 275, and a mobile switching center (MSC) 280.

The MSC 280 is configured to interface with a public switch telephone network (PSTN) 290, and the MSC 280 is also configured to interface with the BSCs 275. Further, the BSCs 275 are coupled to the base stations 270 via backhaul lines. In addition, the backhaul lines may be configured in accordance with any of several interfaces including, for example, E1/T1, ATM, IP, PPP, Frame Relay, HDSL, ADSL, or xDSL. Further, the system may include more than two BSCs 275.

Also, each base station 270 may include one or more sectors, each sector having an omnidirectional antenna or an antenna pointed in a particular direction radially away from the base station 270. Alternatively, each sector may include two antennas for diversity reception. In addition, each base station 270 may be configured to support a plurality of frequency assignments, with each frequency assignment having a particular spectrum (e.g., 1.25 MHz, 5 MHz).

The intersection of a sector and frequency assignment may be referred to as a CDMA channel. The base stations 270 may also be referred to as base station transceiver subsystems (BTSs). In some instances, the term "base station" may be used to refer collectively to a BSC 275, and one or more base stations 270.

The base stations 270 may also be denoted as "cell sites." Alternatively, individual sectors of a given base station 270 may be referred to as cell sites. Further, a terrestrial digital multimedia broadcasting (DMB) transmitter 295 is shown broadcasting to mobile terminals 100 operating within the system.

In addition, the broadcast receiving module 111 (FIG. 1) of the mobile terminal 100 is typically configured to receive broadcast signals transmitted by the DMB transmitter 295. Similar arrangements may be implemented for other types of broadcast and multicast signaling as discussed above.

FIG. 4 further illustrates several global positioning system (GPS) satellites 300. Such satellites facilitate locating the position of some or all of the mobile terminals 100. In FIG. 4, two satellites are shown, but positioning information may be obtained with greater or fewer satellites.

In addition, the position-location module 115 (FIG. 1) of the mobile terminal 100 is typically configured to cooperate with the satellites 300 to obtain desired position information. However, other types of position detection technology, such as location technology that may be used in addition to or instead of GPS location technology, may alternatively be implemented. Some or all of the GPS satellites 300 may alternatively or additionally be configured to provide satellite DMB transmissions.

Further, during typical operation of the wireless communication system, the base stations 270 receive sets of reverse-link signals from various mobile terminals 100. The mobile terminals 100 engage in calls, messaging, and other communications.

In addition, each reverse-link signal received by a given base station 270 is processed within that base station 270, and the resulting data is forwarded to an associated BSC 275. The BSC 275 provides call resource allocation and mobility management functionality including soft handoffs between the base stations 270.

Further, the BSCs 275 also route the received data to the MSC 280, which provides additional routing services for interfacing with the PSTN 290. Similarly, the PSTN interfaces with the MSC 280, and the MSC 280 interfaces with the BSCs 275. The BSCs 275 also control the base stations 270 to transmit sets of forward-link signals to the mobile terminals 100.

In the following description, a control method applicable to the above-configured mobile terminal 100 is explained with respect to various embodiments. However, the following embodiments can be implemented independently or through combinations thereof. In addition, in the following description, it is assumed that the display 151 includes a touch screen. Further, the touch screen or its screen will be indicated by the reference number '400'.

Figure 5:
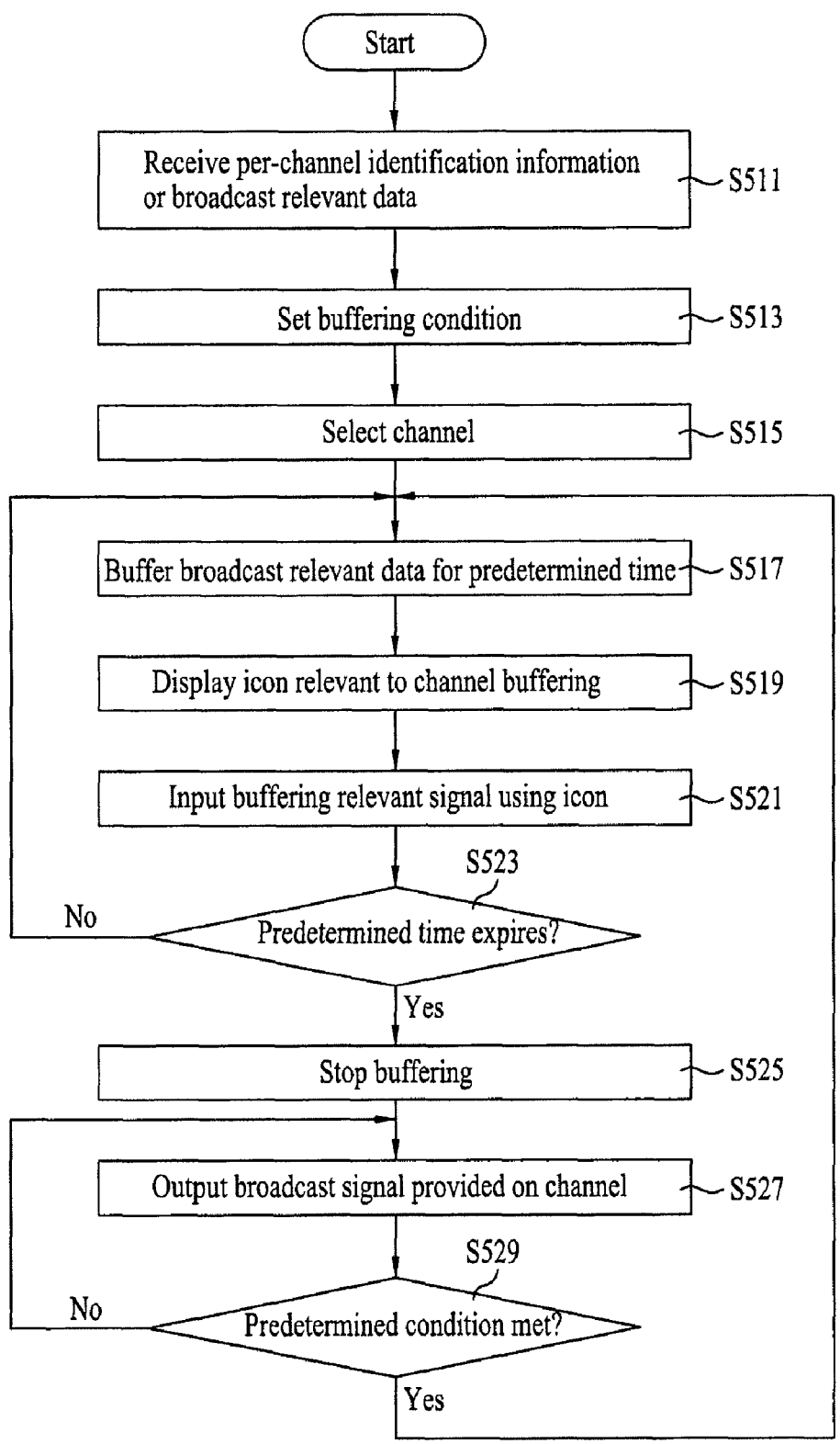
FIG. 5 is a flowchart illustrating a channel buffering method in a terminal according to one embodiment of the present invention.

Next, FIG. 5 is a flowchart illustrating a channel buffering method in a terminal according to one embodiment of the present invention. FIG. 1 will also be referred to in this description. As shown in FIG. 5, the terminal 100 (or controller 180) receives at least one of per-channel identification information and broadcast relevant data from an external server via the wireless communication unit 110 (S511).

The per-channel identification information corresponds to information for identifying at least one channel and the broadcast relevant data corresponds to audio/video data for a broadcast signal provided from the at least one channel. In addition, the per-channel identification information and the broadcast relevant data may be included in the same or different data. Also, the external server is a server that provides the broadcast relevant information to the terminal.

In this embodiment, the DVB-H broadcasting system will be referred to. However, the present invention is applicable to all types of broadcasting systems such as the DVB-T system, the DMB system, the Media FLO system and the like as well as the DVB-H system.

When receiving ESG data, the terminal 100 is able to receive the per-channel identification information. In this instance, the per-channel identification information can be defined in a session description protocol (SDP) file contained within the ESG data. Further, the SDP file contains a per-channel IP address and port information corresponding to the per-channel identification information and is usable for channel selection.

In addition, the controller 180 interprets the SDP file and is then able to obtain the per-channel identification information as a result of the interpretation. When receiving multi-protocol encapsulation data (MPE) data, the terminal 100 is able to receive audio/video data (an example of broadcast relevant data), which is contained in the MPE data, for at least one channel. The MPE data is generated from a plurality of transport stream packets.

Therefore, the controller 180 is able to recognize broadcast relevant data corresponding to the identification information using the per-channel identification information obtained from the SDP file. Further, in the receiving step S511, the terminal 100 is able to receive the per-channel identification information or the broadcast relevant data using a receiving module included with the wireless communication unit 110.

For instance, the terminal 100 is able to receive the per-channel identification information or the broadcast relevant data using the broadcast receiving module 111 when using a broadcasting network, the mobile communication module 112 when using a mobile communication network or the short-range communication module 114 when using a short-range communication network.

Further, the terminal 100 is able to periodically perform the receiving step S511 based on time slicing. For instance, in DVB-H broadcasting system, the terminal 100 alternately performs a broadcast relevant operative section (or ON section) and a broadcast relevant non-operative section (or OFF section) and is able to execute the receiving step S511 in the broadcast relevant operative section.

In addition, the terminal 100 can receive the broadcast relevant data from a specific channel assigned to the specific ON section during the specific ON section. The receiving step S511 can also be executed after the following selecting step S515. The received per-channel identification information can also be stored in the memory 160, which can also prestore the per-channel identification information.

In addition, in FIG. 5, the terminal 100 sets up a channel buffering conditions S513. For instance, the setting step S513 can be carried out by the controller 180. Also, the channel buffering conditions may include a buffering target channel, the number of buffering target channels, a buffering execution time, a buffering order, a buffering period and the like.

Further, when an operation relevant to the channel buffering condition setting is input by a user via the user input unit 130, the terminal 100 is able to execute the setting step S513. The setting step S513 based on the user operation will now be explained in more detail with reference to FIGS. 6 to 7E.

Figure 6:
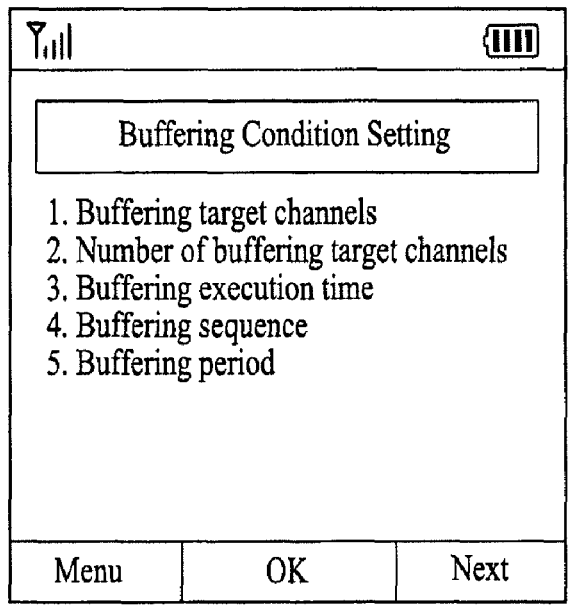
FIG. 6 is an overview of a display screen illustrating buffering condition setting options according to an embodiment of the present invention.
Figure 7A:
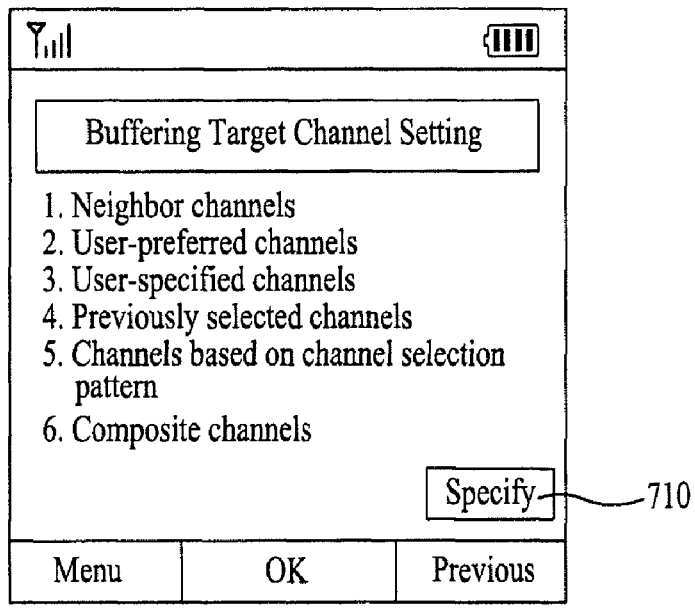
FIG. 7A is an overview of a display screen illustrating target channel buffering condition setting options according to an embodiment of the present invention.
Figure 7B:
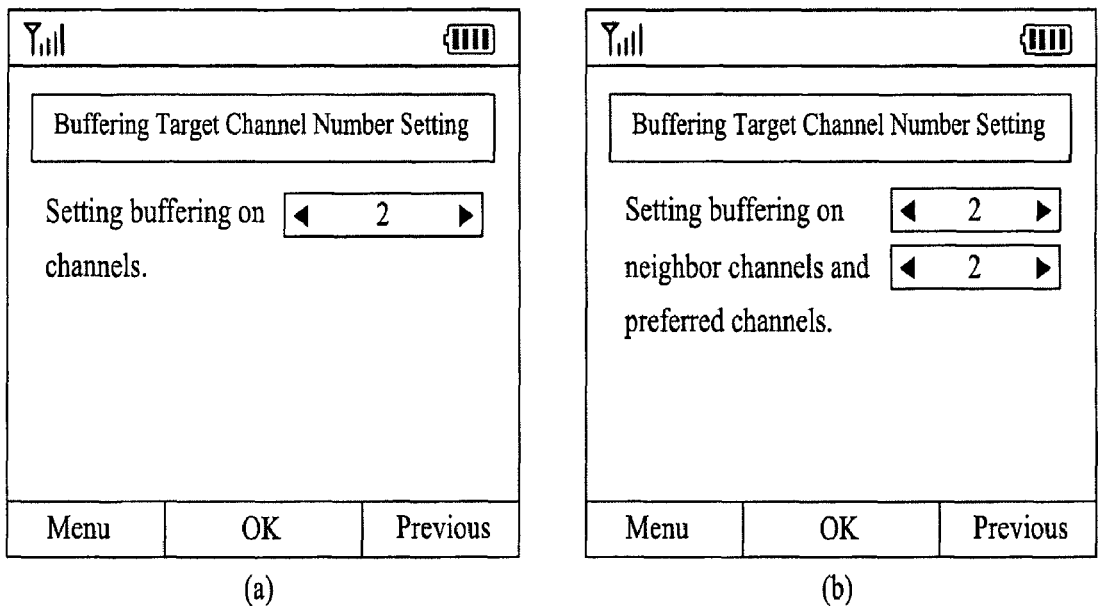
FIGS. 7B(a) and 7B(b) are overviews of a display screen illustrating setting a target channel buffering condition according to another embodiment of the present invention.
Figure 7C:
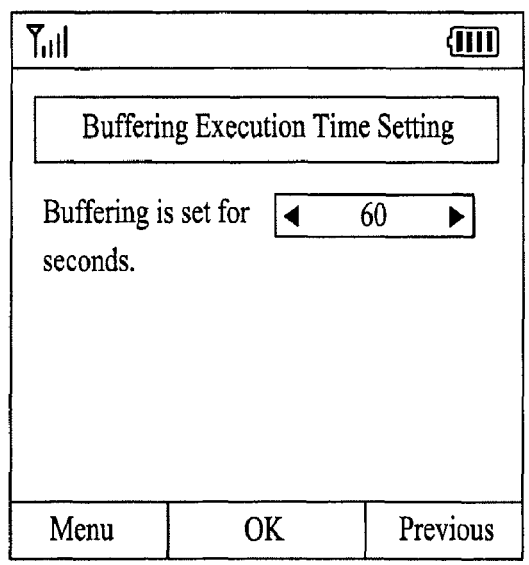
FIG. 7C is an overview of a display screen illustrating setting a channel buffering condition for a predetermined amount of time according to an embodiment of the present invention.
Figure 7D:
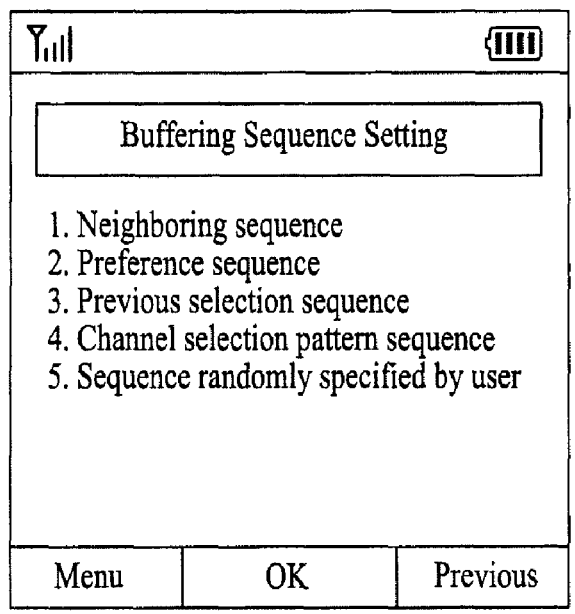
FIG. 7D is an overview of a display screen illustrating channel buffering sequence condition options for a buffering operation according to an embodiment of the present invention.
Figure 7E:
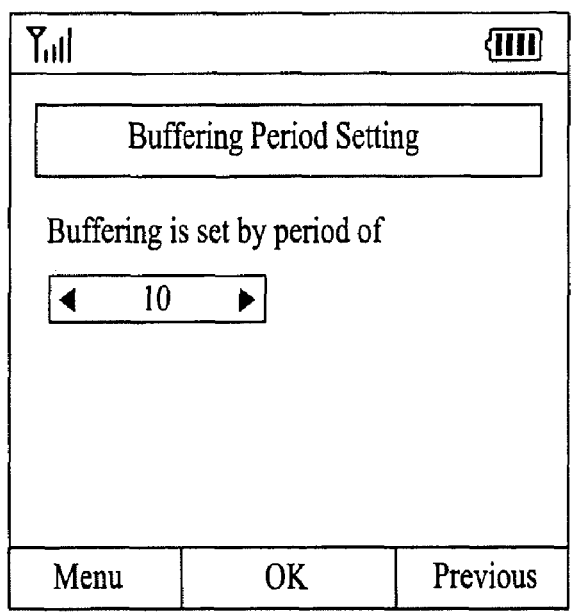
FIG. 7E is an overview of a display screen illustrating setting a buffer period setting for a buffering operation according to an embodiment of the present invention.

That is, FIGS. 6 to 7E are overviews of display screens illustrating a process for setting buffering conditions in the terminal 100 according to one embodiment of the present invention. Referring to FIG. 6, if a menu item for channel buffering condition setting is selected by a user via the user input unit 130, the terminal 100 displays a list including channel buffering condition items (hereinafter referred to as the 'buffering condition list').

As shown in FIG. 7A, if the 'buffering target channel' option is selected from the buffering condition list, the terminal 100 displays a channel type list including at least one or more channel types. Therefore, when a specific channel type is selected from the channel type list by the user, the terminal 100 is able to set a buffering target channel corresponding to the selected channel type.

For instance, and as shown in FIG. 7A, the channel type list can contain neighbor channels, user-preferred channels, user-specified channels, previously selected channels, channel selection pattern based channels, composite channels and the like.

In this instance, the neighbor channels correspond to channels neighboring a currently selected channel (hereinafter referred to as 'neighboring channels'). For example, assuming that Channel-1 to Channel-10 are sequentially assigned, if a currently selected channel is Channel-5, the neighboring channels correspond to Channel-4 and Channel-6. Moreover, the neighbor channels may also correspond to a predetermined number of channels in an up/down direction with reference to a currently selected channel.

In addition, the user-preferred channels correspond to channels specified as preferred channels by a user or channels specified in order of high per-channel use frequency and/or quantity. For instance, the terminal 100 can store the per-channel use frequency and/or quantity in the memory 160 and is then able to specify a predetermined number of channels as user-preferred channels in order of the stored per-channel use frequency and/or quantity.

The user-specified channels correspond to a channel directly specified as a target of channel buffering by a user among a plurality of channels. For example, the user-specified channel includes not only a channel specified one by one by a user among a plurality of channels, but also a channel corresponding to a channel genre, a viewing-restricted age or a pay/free channel specified by the user, among others.

The previously selected channel corresponds to a channel selected by a user for broadcast viewing for a predetermined period. For example, assuming that Channel-1, Channel-3 and Channel-5 are selected for a predetermined period between January 1 to Jan. 10, 2008, the previously selected channels may include Channel-1, Channel-3 and Channel-5.

Also, the channel selection pattern based channels correspond to channels based on a selection direction for channels selected by the user. For example, if a selection direction is a channel number increment direction (channel number decrement direction, odd/even channel, etc.), the channels based on the channel selection pattern may include a predetermined number of channels, each of which channel numbers is greater than that of a currently selected channel.

The composite channels correspond to channels to which at least one of the above-mentioned whole channel types is compositely specified. For example, the composite channels may include 'neighboring channels and user-preferred channels', 'neighboring channels and previously selected channels' or the like.

As shown in FIG. 7B, if the 'the number of buffering target channels' option is selected from the buffering condition list in FIG. 6, the terminal 100 displays an image for enabling the number of buffering target channels to be selected by the user. The terminal 100 is then able to set the number of buffering target channels according to a selection made by the user. In more detail FIG. 7B(a) illustrates a case that there is one buffering target channel. FIG. 7B(b) illustrates a case that there are a plurality of buffering target channels (e.g., when the buffering target channels are composite channels).

As shown in FIG. 7C, if the 'buffering execution time' option is selected from the buffering condition list in FIG. 6, the terminal 100 displays an image for enabling the buffering execution time to be selected by the user. Thus, the terminal 100 is able to set the buffering execution time according to a selection made by the user.

As shown in FIG. 7D, if the 'buffering sequence' option is selected from the buffering condition list in FIG. 6, the terminal 100 displays a buffering sequence type list constructed with at least one buffering sequence type. For example, if buffering target channels are neighboring channels, the buffering sequence type may include one of a neighboring sequence, a preference sequence, a previous selection sequence, a channel selection pattern sequence, a user's random specification sequence and the like. Therefore, the terminal 100 is able to set a buffering sequence according to the buffering sequence type selected by the user.

As shown in FIG. 7E, if the 'buffering period' option is selected from the buffering condition list in FIG. 6, the terminal 100 displays an image for enabling a buffering period to be selected by the user. Thus, the terminal 100 is able to set the buffering period according to a selection made by the user. For example, assuming that a buffering execution time and a buffering period are 60 seconds and 10 seconds, respectively, the terminal 100 is able to execute a total six of buffering operations for 60 seconds with the buffering period of 10 seconds.

Further, the terminal 100 is able to execute the setting step S513 based on a decision made by the controller 180 on a state of the terminal 100 without the above-mentioned user operations. For instance, the controller 180 is able to set at least one of the buffering target channels, the number of the buffering target channels, the buffering execution time and the buffering period based on a remaining quantity of battery, a presence or non-presence of driving other application (e.g., call connection, message writing, MP3 playback, etc.) or the like.

In particular, if a level of the remaining battery quantity is lower than a predetermined reference or if another application is being driven, it is may be necessary to reduce the battery consumption attributed to the buffering execution. Hence, the controller 180 is able to set the buffering execution time to a time equal to or smaller than a reference time (e.g., 60 seconds) or set the buffering period to a period longer than a reference period.

In addition, the terminal 100 is able to perform the setting step S513 based on a wireless signal received via the wireless communication unit 110. For instance, when receiving a wireless signal containing a channel buffering condition, the controller 180 is able to perform the setting step S513 according to the channel buffering condition contained in the received wireless signal. In this instance, the wireless signal can be from a server provided by a broadcasting service provider.

Meanwhile, even if the above channel buffering condition based on the user operation is set, the channel buffering condition can be reset based on a state of the terminal 100 or a wireless signal containing a channel buffering condition. Also, even if a channel buffering condition based on a state of the terminal 100 or a wireless signal containing a channel buffering condition is set, the channel buffering condition can be reset based on the above-mentioned user operation.

In addition, even if a channel buffering condition based on a wireless signal containing a channel buffering condition is set, the channel buffering condition can be reset based on a state of the terminal 100. Also, the user is able to make a selection for setting a channel buffering condition based on one of a user operation, a terminal state and a wireless signal containing a channel buffering condition, etc. The setting step S513 can also be executed ahead of or prior to a prescribed one of the steps shown in FIG. 5 regardless of the procedure sequence shown in FIG. 5.

Further, as shown in FIG. 5, the terminal 100 receives a channel selected by the user via the user input unit 130 (S513). In particular, the terminal 100 is able to execute the selecting step S515 if a command signal for at least one of a channel entry and a channel switching is input by the user via the user input unit 130. In this instance, the channel entry corresponds to an entry into a channel selected from a channel list prior to a broadcast signal output (see, for example, FIG. 8). Also, the channel switching method corresponds to switching to another channel in the course of a broadcast signal output (see FIG. 10, for example).

Further, as the channel has been selected in the selecting step S515, the terminal 100 buffers broadcast relevant data corresponding to at least one channel among a plurality of broadcast relevant data received in the receiving step S515 for a predetermined time (S517). In particular, the buffering step S517 can be performed by the controller 180.

In addition, in order to quickly switch a currently selected channel to another channel, the channel buffering operation means that broadcast relevant data provided from another channel (e.g., a neighboring channel, a user-preferred channel, etc.) is stored in advance.

The terminal 100 also executes the buffering step S517 according to the buffering condition set in the setting step S513. The execution of the buffering step S517 according to the buffering condition will now be explained in more detail. Further, in the following description, for clarity and convenience of explanation, the buffering executed time is assumed to be 60 seconds and the selected channel is assumed to be 'Channel-3'.

Thus, when buffering target channels and the number of the buffering target channels correspond to neighboring to two channels, the terminal 100 is able to perform buffering on Channel-2 and Channel-4, which are the neighboring channels to Channel-3. When buffering target channels and the number of the buffering target channels correspond to four user-preferred channels, the terminal 100 is able to perform buffering on the four channels in order of higher user preference.

Also, when buffering target channels and the number of the buffering target channels correspond to three user-specified channels, the terminal 100 is able to perform buffering on the three channels specified as the buffering target channels by a user. When buffering target channels and the number of the buffering target channels correspond to four previously selected channels, the terminal 100 is able to perform buffering on the four channels having a history of selection by the user for a predetermined period.

In this instance, if the number of the channels having the selection history is greater than four, the terminal 100 is able to specify them as buffering target channels in accordance with various references for four channels selected by a user, four channels in order of higher use frequency/quantity, four channels in order of neighboring to Channel-3, and the like.

When buffering target channels and the number of the buffering target channels correspond to a channel selection pattern based two channels, and assuming that a channel selection direction for a predetermined period is the channel number increment direction, the terminal 100 is able to perform buffering on Channel-4 and Channel-5 located in a channel number increment direction from Channel-3.

Also, when buffering target channels and the number of the buffering target channels correspond to two neighbor channels and two user-preferred channels, the terminal 100 is able to perform buffering on Channel-2 and Channel-4 neighboring to Channel-3 and two channels in order of higher user preference. In this instance, the buffering sequence can be set by the user.

Further, in the buffering step S517, the terminal 100 is able to identify at least one channel for which identification information is set using the per-channel identification information. Also, the terminal 100 is able to perform the buffering operation on broadcast relevant data corresponding to the at least one identified channel each. In this instance, the broadcast relevant data includes information indicating what data corresponds to which channel.

For instance, if two neighboring channels are set as the buffering target channels and the buffering target channel number is set in the setting step S513, the terminal is able to identify the channel (e.g., Channel-3) selected in the selecting step S515 and neighboring channels (e.g., Channel-2 and Channel-4) neighboring to the selected channel and is then able to buffer broadcast relevant data corresponding to each of the identified neighbor channels.

The terminal 100 is also able to display an icon relevant to the channel buffering operation (hereinafter named 'channel buffering icon') via the display 151 while performing the buffering step S517. In more detail, the channel buffering icon can be represented in one of various forms such as an emoticon, image, symbol, animation, flash, text, progressive bar and the like.

Also, the terminal 100 is able to effectively inform a user that the channel buffering operation is in progress using at least one of various feedback means including vibration, alarm sound, voice signal and the like. Further, the channel buffering icon is able to inform the user of the channel buffering operation being in progress or an extent of the channel buffering progress. A channel buffering relevant signal can also be input to the terminal 100 by the user via the channel buffering icon. This feature will be explained in more detail later.

Next, the buffering step S517 and the displaying step S519 are explained in more detail. In particular, FIGS. 8 to 9C are overviews of display screens illustrating output information relevant to a buffering operation when according to one embodiment of the present invention.

Figure 8:
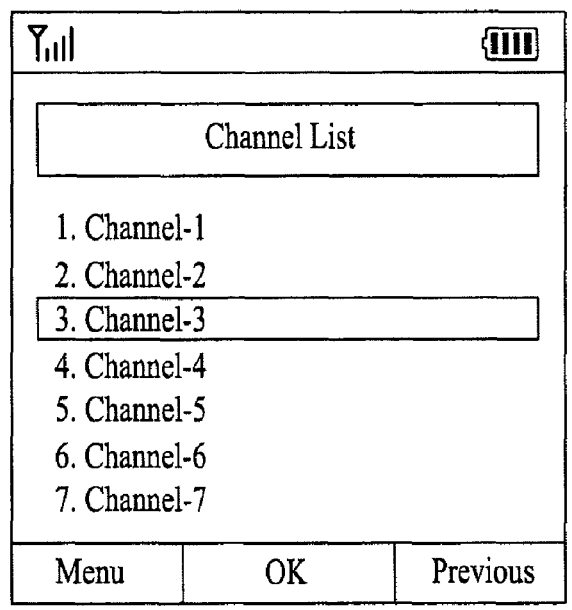
FIG. 8 is an overview of a display screen illustrating a list of available channels for a buffering operation according to an embodiment of the present invention.
Figure 9A:
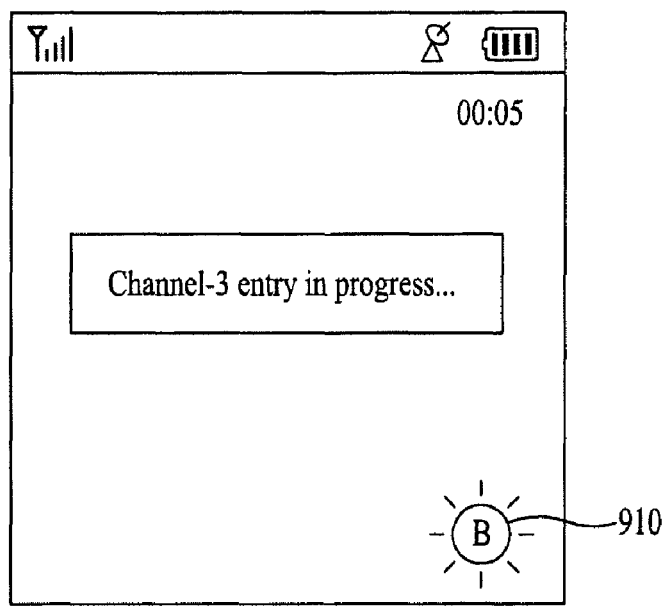
FIG. 9A is an overview of a display screen illustrating selecting a channel from a list of available channels for a buffering operation according to an embodiment of the present invention.

Referring to FIG. 8, if a specific channel 'channel-3' is selected from the channel list by a user, the terminal 100 is able to enter Channel-3. Referring to FIG. 9A, when entering Channel-3, the terminal 100 is able to display a channel buffering icon 910 for indicating that channel buffering operation is in progress on a portion of a screen while displaying that Channel-3 entry is in progress.

Figure 9B:
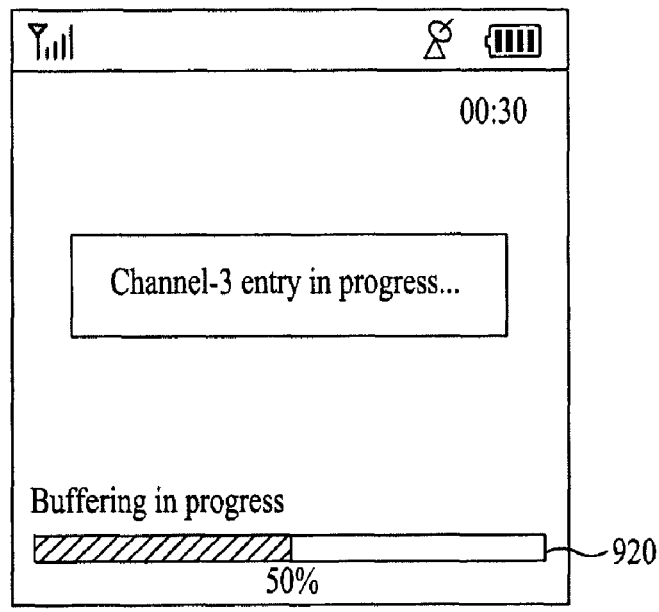
FIG. 9B is an overview of a display screen illustrating selecting a channel from a list of available channels for a buffering operation according to another embodiment of the present invention.

Referring to FIG. 9B, when entering Channel-3, the terminal 100 is also able to display a progressive bar type channel buffering icon 920 for indicating an extent of the channel buffering operation while displaying that Channel-3 entry is in progress. Referring to FIG. 9C, when entering Channel-3, the terminal 100 is also able to display a window 930 for indicating information on the channel buffering operation such as a buffering execution time, buffering target channels, the number of the buffering target channels and the like. A channel buffering icon 910 is also displayed while displaying that Channel-3 entry is in progress.

Figure 9C:
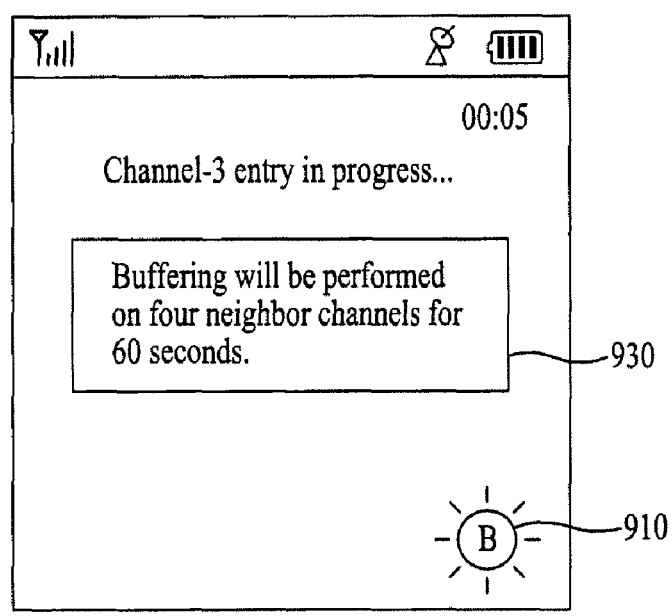
FIG. 9C is an overview of a display screen illustrating selecting a channel from a list of available channels for a buffering operation according to still another embodiment of the present invention.

Further, even if the entry into Channel-3 is successfully completed before the buffering execution time, the terminal 100 is able to display the channel buffering icon shown in one of FIGS. 9A to 9C on a portion of the screen while outputting a broadcast signal (video or audio signal) provided on Channel 3.

Figure 10:
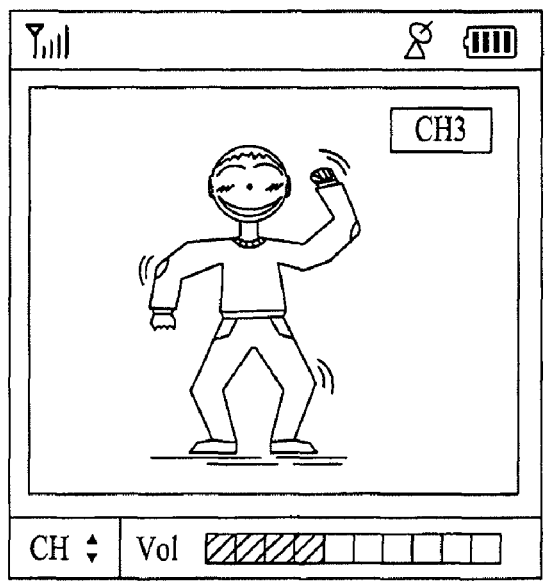
FIG. 10 is an overview of a display screen illustrating a broadcast channel being output according to an embodiment of the present invention.

Next, FIGS. 10 to 12B are overviews of display screens illustrating outputting information on a buffering operation during a channel switching operation in a terminal according to one embodiment of the present invention. Referring to FIG. 10, if a specific channel 'Channel-4' is selected by a user while a broadcast signal provided on Channel-3 is being output, the terminal 100 is able to switch to Channel-4. For this operation, the user is able to select Channel-4 from the channel list or select Channel-4 using a channel selection key (e.g., a direction key).

Figure 11A:
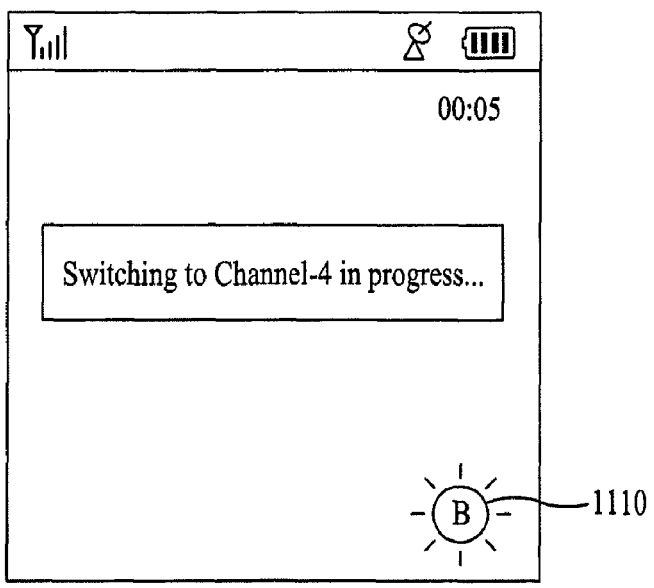
FIG. 11A is an overview of a display screen illustrating a broadcast channel being switched according to an embodiment of the present invention.
Figure 11B:
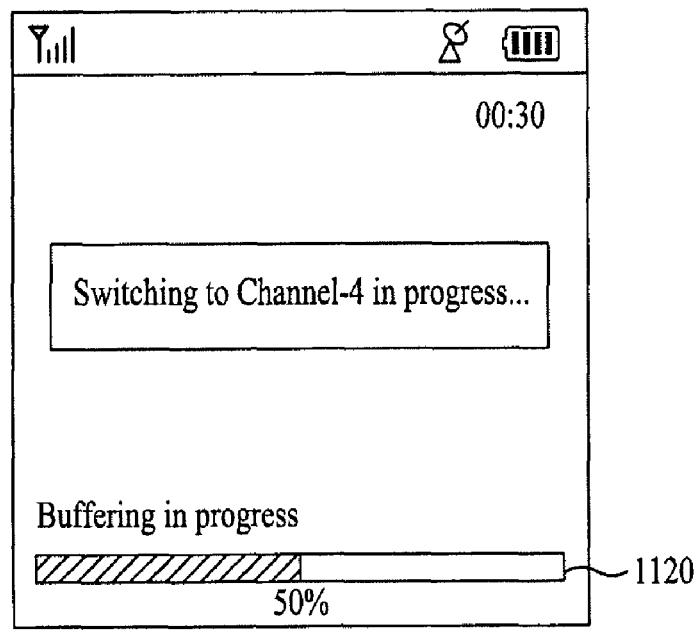
FIG. 11B is an overview of a display screen illustrating a broadcast channel being switched according to another embodiment of the present invention.

Referring to FIG. 11A, when switching to Channel-4, the terminal 100 is able to display a channel buffering icon 1110 for indicating that channel buffering operation is in progress on a portion of a screen while displaying that switching to Channel-4 is in progress. Referring to FIG. 11B, when switching to Channel-4, the terminal 100 is also able to display a progressive bar type channel buffering icon 1120 for indicating an extent of the channel buffering operation while displaying that switching to Channel-4 is in progress.

Figure 11C:
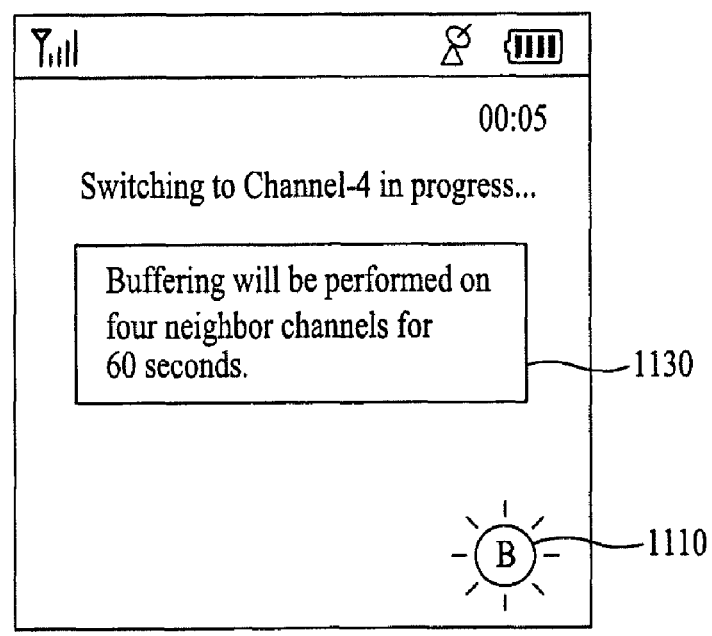
FIG. 11C is an overview of a display screen illustrating a broadcast channel being switched according to still another embodiment of the present invention.

Referring to FIG. 11C, when entering Channel-4, the terminal 100 is able to display a window 1130 for indicating information on the channel buffering operation such as a buffering execution time, buffering target channels, the number of the buffering target channels and the like. A channel buffering icon 1110 is also displayed while displaying information that switching to Channel-4 is in progress.

Figure 12A:
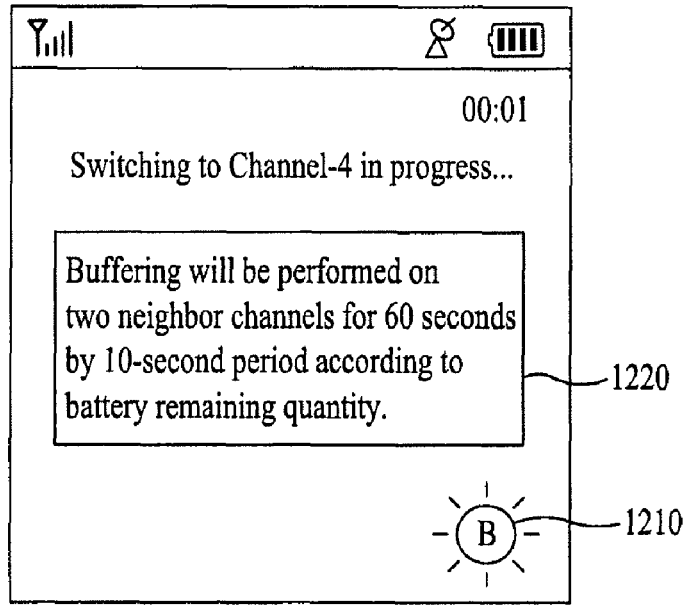
FIG. 12A is an overview of a display screen illustrating information being displayed about an upcoming buffering operation being performed according to an embodiment of the present invention.
Figure 12B:
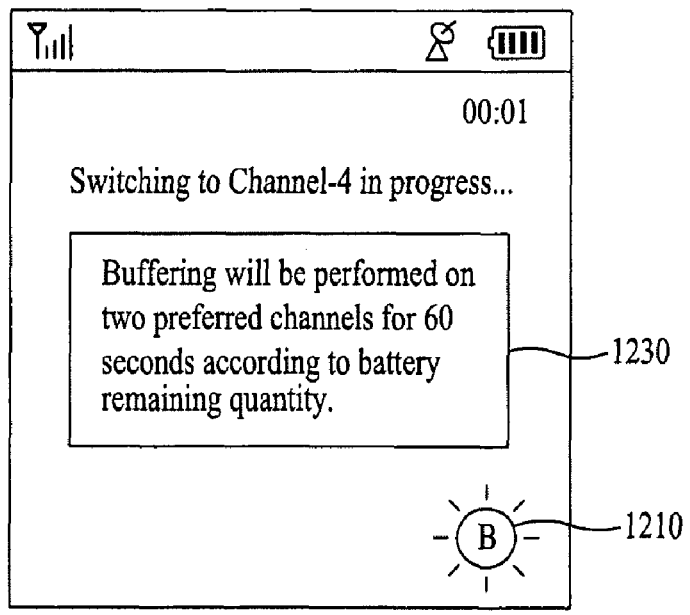
FIG. 12B is an overview of a display screen illustrating information being displayed about an upcoming buffering operation being performed according to another embodiment of the present invention.

Referring to FIGS. 12A and 12B, when switching to Channel-4, the terminal 100 is also able to set a buffering condition (mentioned in the foregoing description) according to a current battery remaining quantity and is also able to provide the set buffering condition to a user. In doing so, the terminal 100 is able to display a channel buffering icon 1210 on a portion of a screen.

In addition, even if the switching to Channel-4 is successfully completed before completion of the buffering execution time, the terminal 100 is able to display the channel buffering icon shown in one of FIGS. 11A to 12B on a portion of the screen while outputting a broadcast signal provided on Channel 4.

Figure 13A:
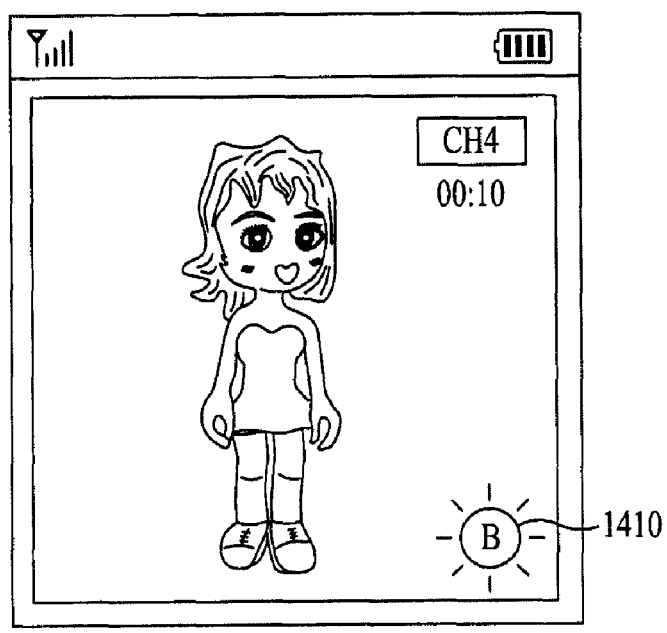
FIG. 13A is an overview of a display screen illustrating a buffering operation being performed according to an embodiment of the present invention.
Figure 13B:
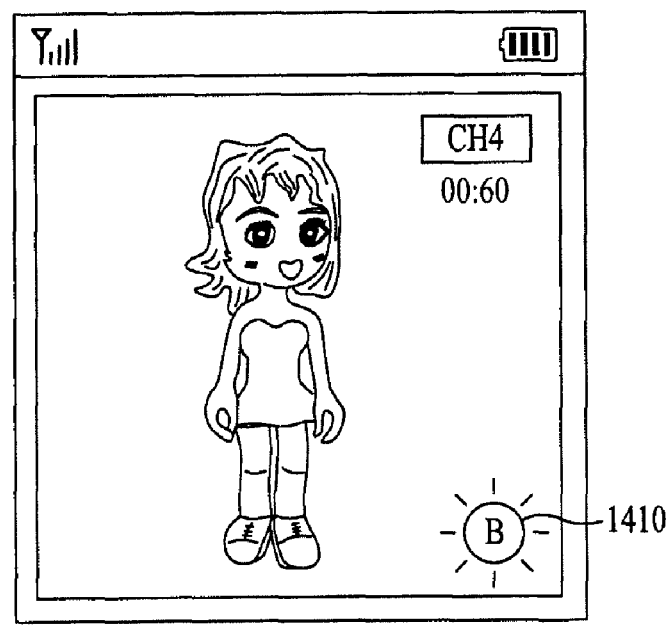
FIG. 13B is an overview of a display screen illustrating a buffering operation being performed according to another embodiment of the present invention.
Figure 13C:
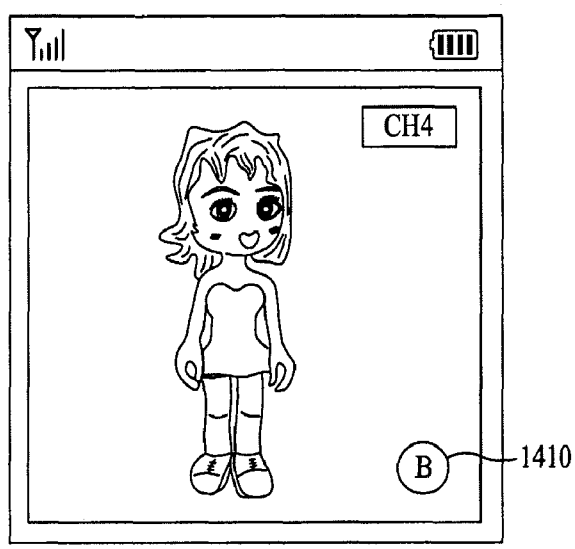
FIG. 13C is an overview of a display screen illustrating a buffering operation being performed according to still another embodiment of the present invention.

Next, FIGS. 13A to 13C are overviews of display screens illustrating displaying a channel buffering relevant icon for a buffering time in a terminal according to one embodiment of the present invention, in which a buffering execution time is assumed to be 60 seconds for clarity and convenience of explanation.

If switching to Channel-4 (or entry into Channel-4) is successfully completed before the buffering execution time of 60 seconds, the terminal 100 is able to display a channel buffering icon 1410 on a portion of a screen while outputting a broadcast signal (in particular, video signal) provided on Channel-4 to the screen (see FIGS. 13A and 13B, for example). Also, in order to inform a user of a channel buffering progress extent, the terminal 100 is able to display a buffering progress time on another portion of the screen.

Further, the displayed exterior elements of the channel buffering icon 1410 such as the color, brightness, chroma, color thickness, size and the like may be changed according to the channel buffering progress extent.

In addition, as the buffering execution time of 60 seconds expires, the terminal 100 stops the execution of the channel buffering operation and then maintains outputting the broadcast signals provided on Channel-4. In this instance, to receive a channel buffering command signal or a buffering target channel editing signal from a user (explained later), the terminal 100 may maintain displaying the channel buffering icon 1410 (see FIG. 13C, for example).

Further, in order to enable a user to discriminate the channel buffering icon in the course of the buffering operation from the channel buffering icon after completion of the buffering operation, the terminal 110 is able to display the two channel buffering icons in different ways. For example, each of the channel buffering icons can be displayed in different colors, color thickness, boldness or the like. Alternatively, the channel buffering icon in the course of the buffering operation can be displayed to blink or be displayed as a dynamic icon.

Referring again to FIG. 5, the terminal 100 receives a buffering relevant signal from a user using the channel buffering icon (S521). In this instance, the buffering relevant signal can include a buffering stop signal or a buffering target channel editing signal. In particular, the buffering stop signal corresponds to a command signal for stopping a buffering operation currently in progress if a user selects the channel buffering icon.

The buffering target channel editing signal corresponds to a signal for receiving a change, deletion, setting or the like of a buffering target channel if the user selects the channel buffering icon, or may correspond to a command signal for setting a state to have the user set a channel buffering condition (see FIGS. 6 to 7E, for example). The inputting step S521 will now explained in more detail with reference to FIGS. 14(*a*) and 14(*b*).

Figure 14:
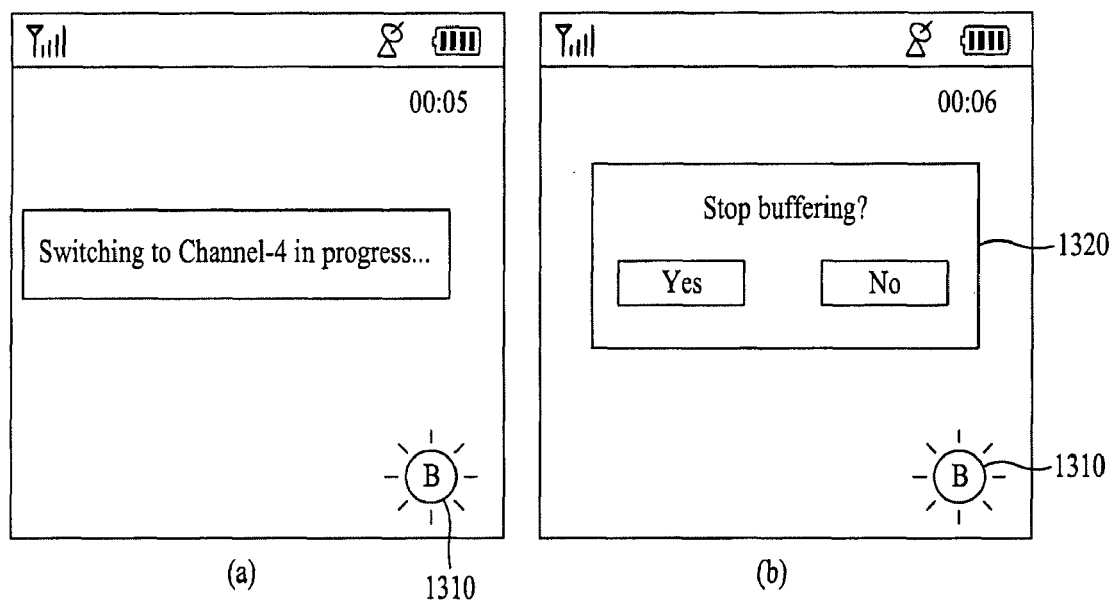
FIGS. 14(a) and 14(b) are overviews of display screens allowing a user to stop a buffering operation according to an embodiment of the present invention.

That is, FIGS. 14(*a*) and 14(*b*) are overviews of display screens for receiving a buffering stop signal in the course of channel buffering operation in the terminal 100 according to one embodiment of the present invention. Referring to FIG. 14(*a*), the terminal is able to display a channel buffering icon 1310 in the course of executing channel buffering.

Also, as shown in FIG. 14(*b*), the terminal 100 is able to display a window 1320 for enabling a user to select whether to stop the channel buffering operation if the channel buffering icon 1310 is selected by the user. Hence, the user is able to freely select whether to stop the channel buffering operation using the channel buffering icon.

In addition, the terminal 100 is able to display a window for enabling a user to input an editing signal of buffering target channels if the channel buffering icon 1310 is selected by the user. Further, when the channel switching (or the channel entry) is successfully completed before completion of the buffering execution time, the terminal 100 is able to receive the above-mentioned buffering relevant signal while displaying a broadcast signal provided on a corresponding channel and the channel buffering icon on a screen.

Referring again to FIG. 5, the terminal 100 decides whether a predetermined time (or the buffering execution time)

expires (S523). The deciding step S523 can be performed by the controller 180. In addition, the terminal 100 can include a timer (not shown in the drawings) for confirming at least one selected from a start point, end point and expiration of the predetermined time. Thus, the controller 180 can receive confirmation information on the predetermined time from the timer and is then able to perform a buffering operation for the predetermined time.

Further, if it is decided that the predetermined time has expired (Yes in the deciding step S523), the terminal 100 stops the channel buffering operation in the buffering step S517 (S525). On the contrary, if it is decided that the predetermined time has not expired (No in the deciding step S523), the terminal 100 goes back to the buffering step S517 and then continues performing the channel buffering operation.

The terminal 100 then outputs the broadcast signals provided on the channel selected in the selecting step S515 (S527). Further, the outputting step S527 according to FIG. 5 is depicted as being executed after the channel buffering has stopped. However, the broadcast signal provided on the selected channel can be outputted in the course of executing the channel buffering (or, even if the predetermined time does not expire).

As mentioned in the foregoing description, the terminal 100 is able to perform the channel buffering operation while outputting broadcast signals. Also, the terminal 100 decides whether a state of a currently output broadcast signal meets a predetermined condition in the course of executing the outputting step S527 (S529).

If it is decided in the deciding step S529 that the predetermined condition is met, the terminal 100 is able to maintain performing the channel buffering operation by going back to the buffering step S517 while maintaining a broadcast signal outputting operation. On the contrary, if it is decided in the deciding step S529 that the predetermined condition is not met, the terminal 100 is able to maintain performing the broadcast signal outputting operation.

In this instance, the predetermined condition may correspond to whether an end point of a specific broadcast program or a predetermined point ahead of the end point is reached if a currently output broadcast signal includes the specific broadcast program.

Figure 15A:
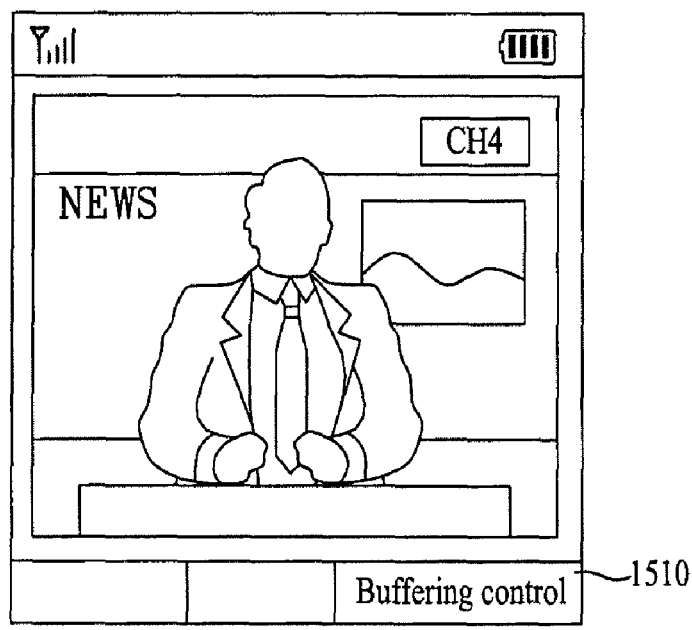
FIGS. 15A to 15C are overviews of display screens illustrating a buffering operation being performed when predetermined conditions are met according to an embodiment of the present invention.
Figure 15B:
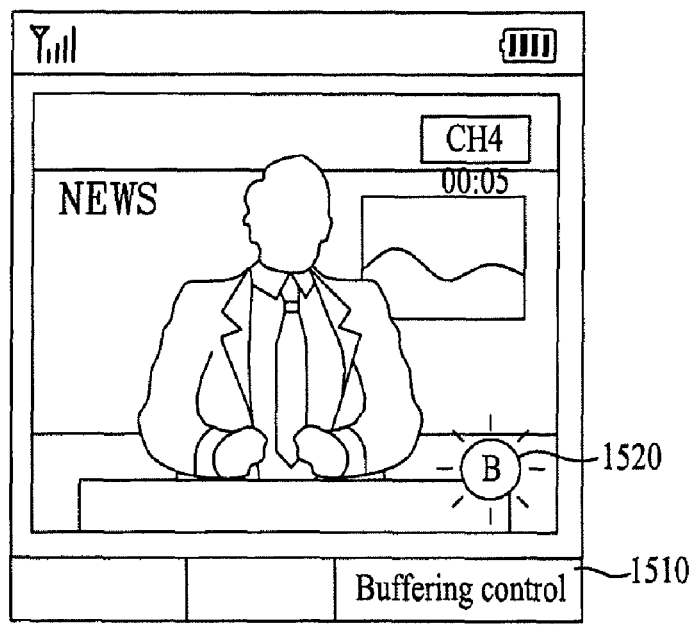
Figure 15C:
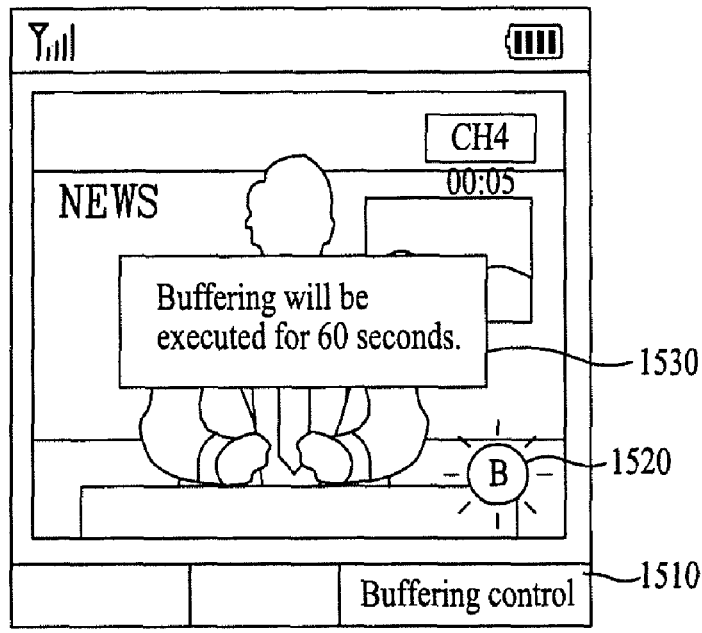

For instance, referring to FIGS. 15A to 15C, while a broadcast program provided on Channel-4 is output (FIG. 15A), and if an end point of a specific broadcast program or a predetermined point (hereinafter named 'buffering start point') ahead of the end point is reached, the terminal 100 is able to execute a buffering operation for a predetermined time from the buffering start point (FIGS. 15B and 15C). In this instance, the predetermined condition may correspond to whether a predetermined point of a currently output commercial broadcast is reached if the currently output broadcast signal configures the commercial broadcast.

Figure 16A:
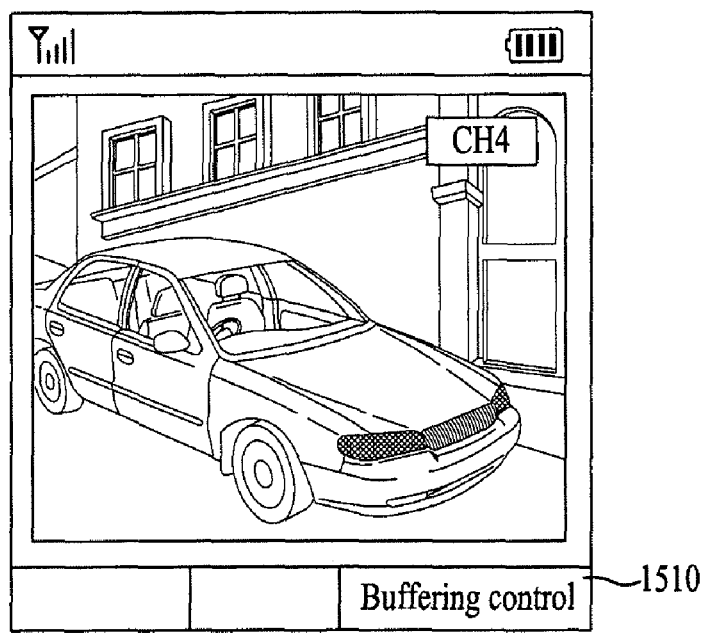
FIGS. 16A to 16C are overviews of display screens illustrating a buffering operation being performed when predetermined conditions are met according to another embodiment of the present invention.
Figure 16B:
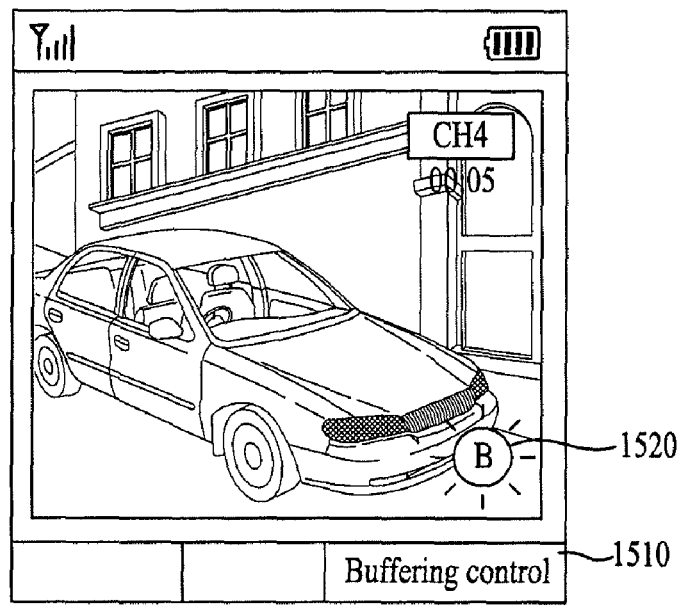
Figure 16C:
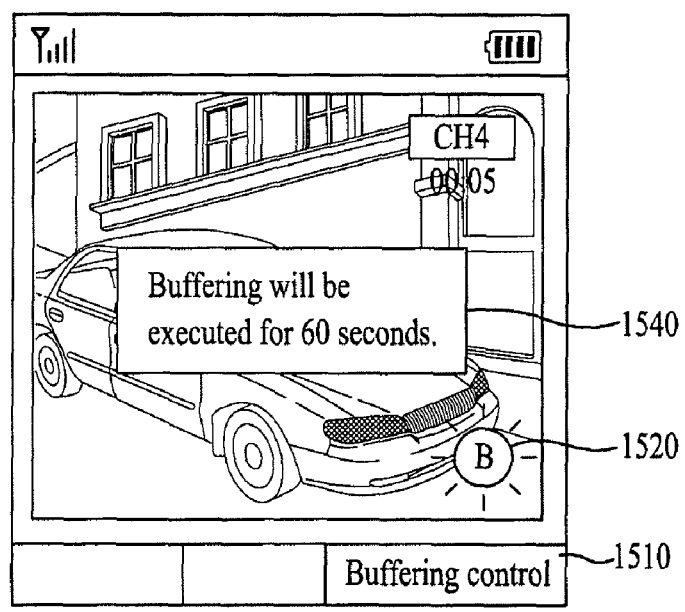

For instance, and referring to FIGS. 16A to 16C, in the course of outputting a commercial broadcast provided on Channel-4 (FIG. 16A), if a random point (hereinafter named 'buffering start point') of the currently output commercial broadcast is reached, the terminal 100 is able to perform a buffering operation for a predetermined time from the buffering start point (FIG. 16B and FIG. 16C).

Figure 17A:
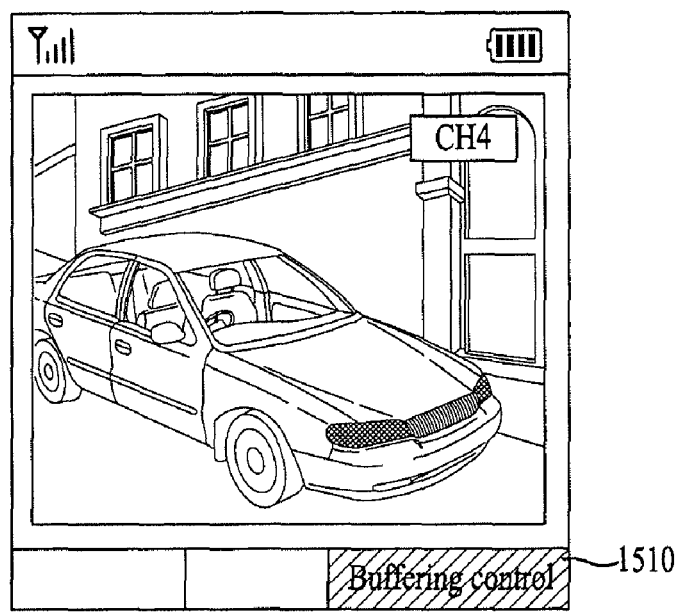
FIGS. 17A to 17C are overviews of display screens illustrating a buffering operation being performed when user set conditions are input according to an embodiment of the present invention.
Figure 17B:
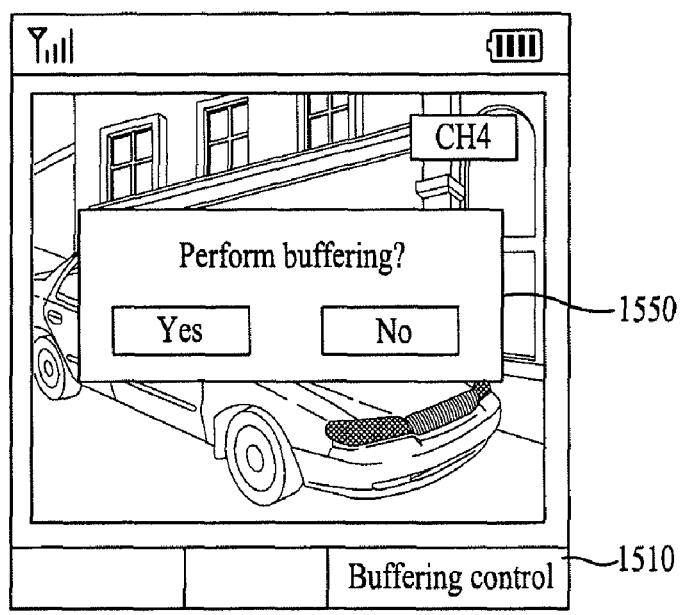

Further, the predetermined condition may correspond to a situation in which a channel buffering command is input by a user in the course of outputting the broadcast signal. For instance, and referring to FIGS. 17A to 17C, if a buffering control area 1510 is selected in the course of outputting a broadcast signal provided on Channel-4 (FIG. 17A), the terminal 100 is able to display a window 1550 for enabling a user to select whether to execute buffering (FIG. 17B).

Figure 17C:
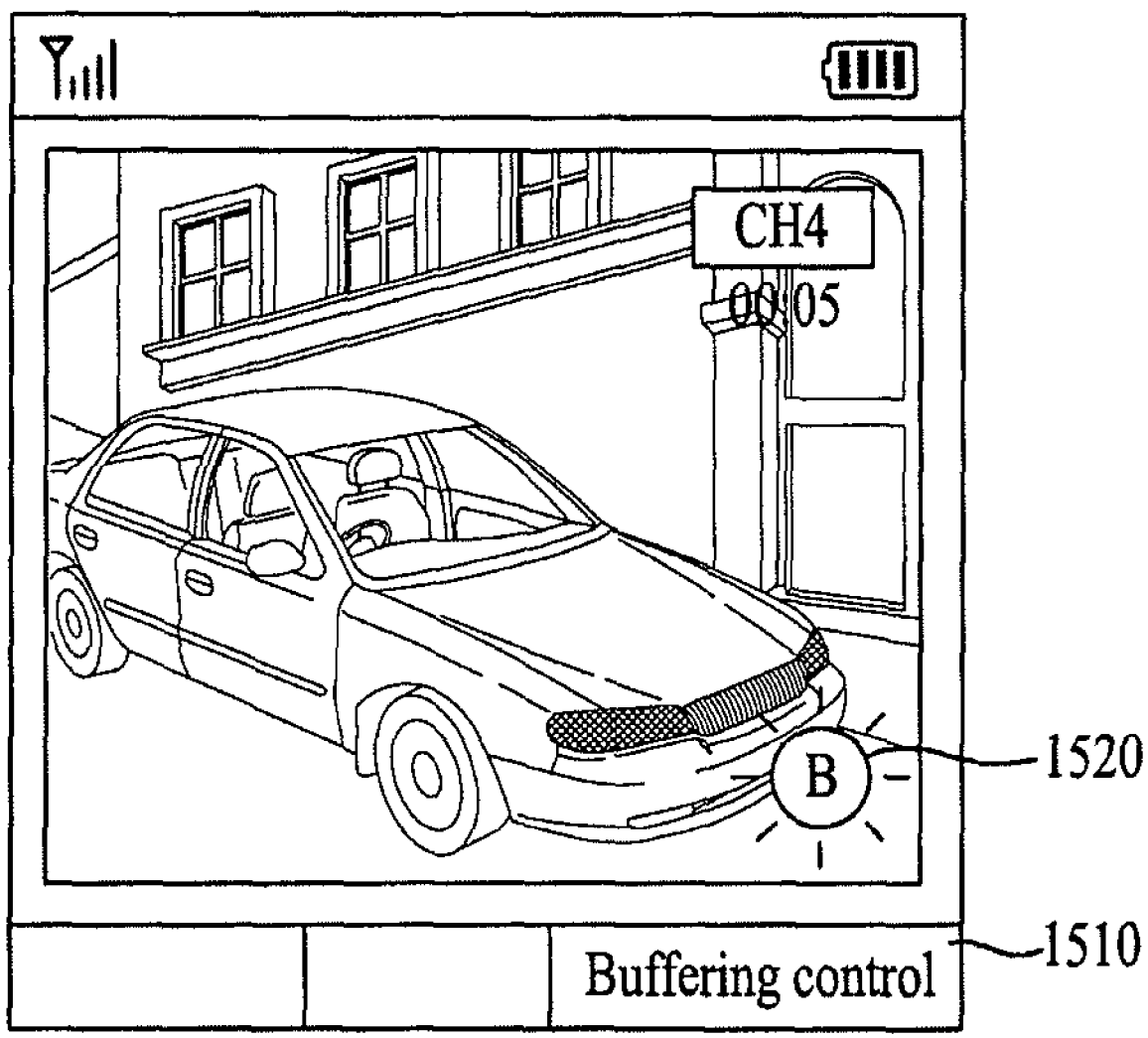

If the user selects the buffering execution (the 'yes' option is selected in FIG. 17B), the terminal 100 is able to execute the channel buffering operation (FIG. 17C). Further, if there exists a preset buffering execution period, the terminal 100 is able to perform a buffering operation according to the buffering execution period. For example, if the buffering execution period is set to 1 hour, the terminal 100 is able to perform the buffering operation in a 1-hour unit.

In some instances, the buffering operation according to embodiments of the present invention can be executed if a command signal for executing the channel buffering operation is received from a broadcast service provider server (or a broadcast relevant server). Also, the channel buffering operation according to embodiments of the present invention can be executed only if a battery remaining quantity is equal to or greater than a predetermined reference.

In addition, the present invention is applicable to a terminal that supports at least one broadcasting technology or at least one broadcasting service provider. Further, channels belonging to different broadcasting technologies (or different broadcast service providers) can be set to the target channels of the buffering operation according to embodiments of the present invention as well as channels belonging to the same broadcasting technology.

Further, according to embodiments of the present invention, the above-described channel buffering method in the terminal can be implemented in a program recorded medium as computer-readable codes. The computer-readable media include all types of recording devices in which data readable by a computer system are stored. The computer-readable media include ROM, RAM, CD-ROM, magnetic tapes, floppy discs, optical data storage devices, and the like for example and also include carrier-wave type implementations (e.g., transmission via Internet). Also, the computer can include the controller 180 of the terminal 100.

Accordingly, the present invention provides several advantages.

First of all, because the channel buffering operation is performed for a predetermined time, the present invention is able to reduce battery consumption caused by channel buffering.

Secondly, the present invention is capable of buffering various type channels including preferred channels and the like as well as neighboring channels to a selected channel, thereby sufficiently reflecting a user's demand for channels to buffer.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A mobile terminal, comprising:
a user input unit configured to select a broadcast channel;
a timer configured to start counting a predetermined time when a first broadcast channel is selected by a channel entry or a channel switching; and
a controller configured to buffer broadcast data of at least one second broadcast channel different than the first broadcast channel for the predetermined time if the first broadcast channel is selected by the channel entry or the channel switching and to stop buffering the broadcast data of the at least one second broadcast channel when the predetermined time expires.

2. The mobile terminal of claim 1, wherein the first channel is selected when a broadcasting function of the mobile terminal is initiated.

3. The mobile terminal of claim 1, wherein the controller is further configured to determine a remaining amount of battery capacity of the mobile terminal, and to stop buffering the broadcast data of the at least one second broadcast channel when the remaining amount of battery capacity is less than a predetermined threshold.

4. The mobile terminal of claim 1, further comprising:
a wireless communication unit configured to receive the broadcast data,
wherein the controller is further configured to receive and buffer the broadcast data of the at least one second broadcast channel based on a time slicing operation such that the broadcast data of the at least one second broadcast channel is only received in an ON period of the time splicing operation.

5. The mobile terminal of claim 1, further comprising:
a wireless communication unit configured to receive per-channel identification information; and
a memory configured to store the per-channel identification information,
wherein the controller is further configured to identify the broadcast data of at the least one second channel using the per-channel identification information.

6. The mobile terminal of claim 1, wherein the input unit is further configured to receive a command signal for a channel entry operation to enter the first broadcast channel or a channel switching operation to be switched to the first broadcast channel.

7. The mobile terminal of claim 1, wherein the at least one second broadcast channel includes at least one of neighbor channels of the selected first broadcast channel, user-preferred channels, user-specified channels, previously selected channels, channels based on a channel selection pattern and a combination of the above channels.

8. The mobile terminal of claim 1, wherein the controller is further configured to automatically set without user intervention the at least one second broadcast channel to be at least one of preset buffering target channels, a number of the buffering target channels, a buffering execution time, a buffering period, and a buffering sequence.

9. The mobile terminal of claim 8, wherein the controller is further configured to automatically set the at least one second broadcast channel according to a remaining quantity of a battery of the terminal.

10. The mobile terminal of claim 1, further comprising:
a display configured to display information indicating that the broadcast data of the at least one second broadcast channel is being buffered.

11. The mobile terminal of claim 10, wherein the display is further configured to display the information indicating the broadcast data of the at least one second broadcast channel is being buffered when the first broadcast channel is selected and the controller is entering the first broadcast channel or when the controller switches into the at least one second broadcast channel from the first broadcast channel.

12. The mobile terminal of claim 10, wherein the display is further configured to display information indicating an amount of time left for buffering the broadcast data of the at least one second broadcast channel.

13. The mobile terminal of claim 10, wherein the display is further configured to display information indicating the buffering of the broadcast data of the at least one second broadcast channel will be performed in a certain amount of time.

14. The mobile terminal of claim 1, wherein the user input unit is further configured to receive at least one of a buffering stop signal to stop buffering the broadcast data of the at least one second broadcast channel, a buffering command signal to display information about the buffering of the broadcast data of the at least one second broadcast channel, and a buffering target channel editing signal to edit the buffering of the at least one second broadcast channel.

15. The mobile terminal of claim 10, further comprising:
an output unit configured to output a broadcast signal corresponding to the selected first broadcast channel,
wherein the controller is further configured to buffer the broadcast data of the at least one second broadcast channel when outputting the broadcast signal via the output unit.

16. The mobile terminal of claim 15, wherein the display is further configured to display information indicating how much time is left before the output broadcast signal is going to end.

17. The mobile terminal of claim 15, wherein the controller is further configured to buffer the broadcast data of the at least one second channel when the broadcast signal is stopped being output or a predetermined time before the broadcast signal is stopped from being output.

18. The mobile terminal of claim 15, wherein the controller is further configured to buffer the broadcast data of the at least one second channel at a random point from when the broadcast program corresponding to the first broadcast channel is being output.

19. A method of controlling a mobile terminal, the method comprising:
selecting a broadcast channel;
counting a predetermined time when a first broadcast channel is selected by a channel entry or a channel switching;
buffering broadcast data of at least one second broadcast channel different than the first broadcast channel for the predetermined time when the first broadcast channel is selected by the channel entry or the channel switching; and
stopping the buffering the broadcast data of the at least one second broadcast channel when the predetermined time expires.

20. The method of claim 19, wherein the at least one second broadcast channel includes at least one of neighbor channels of the selected first broadcast channel, user-preferred channels, user-specified channels, previously selected channels, channels based on a channel selection pattern and a combination of the above channels.

* * * * *